United States Patent [19]
Squires et al.

[11] Patent Number: 5,912,458
[45] Date of Patent: Jun. 15, 1999

[54] MULTIPLE BEAM SCANNING SYSTEM FOR AN IMAGING DEVICE

[75] Inventors: David P. Squires, Lebanon; Ronald G. Goulet, Hebron; Alan W. Menard, Bolton, all of Conn.; David R. Fournier, Hudson, Mass.

[73] Assignee: Gerber Systems Corporation, South Windsor, Conn.

[21] Appl. No.: 08/844,250

[22] Filed: Apr. 18, 1997

[51] Int. Cl.$^6$ .................................................. H01J 3/14
[52] U.S. Cl. .......................................... 250/234; 399/211
[58] Field of Search .................................. 250/234, 235, 250/208.1; 355/55, 53, 56; 358/474, 497, 482, 483; 399/211, 208, 209; 235/472, 462

[56] References Cited

U.S. PATENT DOCUMENTS

| | | |
|---|---|---|
| 3,272,568 | 9/1966 | Koorneef et al. .................. 308/5 |
| 3,816,659 | 6/1974 | Landsman ...................... 178/7.6 |
| 3,857,031 | 12/1974 | Sinclair et al. ................. 250/206 |
| 3,894,276 | 7/1975 | Janssen ....................... 318/135 |
| 3,938,191 | 2/1976 | Jarmy ......................... 360/102 |
| 4,012,676 | 3/1977 | Giebler ....................... 318/135 |
| 4,028,732 | 6/1977 | Salter et al. .................. 358/289 |
| 4,131,916 | 12/1978 | Landsman ...................... 358/285 |
| 4,186,991 | 2/1980 | Koide et al. . |
| 4,209,239 | 6/1980 | Wood et al. . |
| 4,387,452 | 6/1983 | Bricot et al. .................. 369/32 |
| 4,402,061 | 8/1983 | Haz et al. ..................... 365/127 |
| 4,409,624 | 10/1983 | Kingsley ...................... 358/285 |
| 4,413,863 | 11/1983 | Lombard ....................... 308/5 |
| 4,415,911 | 11/1983 | Tazaki ........................ 346/140 |
| 4,417,330 | 11/1983 | Hazel et al. ................... 369/32 |
| 4,432,082 | 2/1984 | Hsieh et al. ................... 369/32 |
| 4,432,083 | 2/1984 | Hsieh et al. ................... 369/44 |
| 4,435,797 | 3/1984 | Hsieh et al. ................... 369/32 |
| 4,443,870 | 4/1984 | Hazel et al. ................... 369/44 |
| 4,445,798 | 5/1984 | Munehiro ...................... 400/320 |

(List continued on next page.)

FOREIGN PATENT DOCUMENTS

| | | |
|---|---|---|
| 0 052 346 | of 0000 | European Pat. Off. . |
| 30 14 409 | 10/1980 | Germany . |
| 44 11 574 | 5/1995 | Germany . |
| 2 049 300 | 12/1980 | United Kingdom . |

OTHER PUBLICATIONS

"Linear Motor Applications" by Boaz Eidelberg, Anorad Corp., Oct. 1992, pp. 49, 50, 53 and 54.

"Air Bearings, Technology & Applications" by Robert Kody, Dover Instrument Corporation, Nov./Dec. 1992, pp. 14, 16 & 18.

"The Amateur Scientist" by Shawn Carlson, Scientific American, Aug. 1996, pp. 96, 98–99.

*Primary Examiner*—Que Le
*Attorney, Agent, or Firm*—McCormick, Paulding & Huber

[57] ABSTRACT

A multiple beam scanning system for an imaging device, such as a photoplotter and scanner, includes a plurality of scanning assemblies slidably coupled to a spar that extends the length and parallel to the longitudinal axis of a scanning surface of an internal drum. The scanning assemblies simultaneously reflect a plurality of optical beam to or from a plate of media disposed on the scanning surface. A photoplotter includes a plurality of independently controlled optical beam generators that emit an optical beam to a corresponding scanning assembly which then reflects the optical beams to the media. A scanner includes a plurality of optical beam receivers that generate imaging signals indicative of the optical beam reflected from the media by each corresponding scanning assembly. The optical beam generators and receivers may be disposed at one end of the internal drum. This embodiment requires the rearward scanning assembly include an optical periscope for reflecting the optical beam parallel to the longitudinal axis of the internal drum. A controller generates independent drive signals to move each of the scanning assemblies along the spar at a preferred rate for scanning the media. For a photoplotter, the controller also provides modulating signals representative of the image to be scanned to each of the beam generators.

46 Claims, 22 Drawing Sheets

U.S. PATENT DOCUMENTS

| | | | |
|---|---|---|---|
| 4,455,910 | 6/1984 | Kraft et al. | 83/874 |
| 4,476,496 | 10/1984 | Thaler | 358/286 |
| 4,489,406 | 12/1984 | Hsieh et al. | 369/32 |
| 4,494,226 | 1/1985 | Hazel et al. | 369/45 |
| 4,543,615 | 9/1985 | Van Campenhout et al. | 358/285 |
| 4,585,331 | 4/1986 | Stoffel et al. | 355/8 |
| 4,631,432 | 12/1986 | Thaler | 310/14 |
| 4,666,315 | 5/1987 | Scranton | 384/1 |
| 4,704,712 | 11/1987 | Siryj | 369/249 |
| 4,798,478 | 1/1989 | Crystal | 384/12 |
| 4,834,353 | 5/1989 | Chitayat | 269/73 |
| 4,985,651 | 1/1991 | Chitayat | 310/12 |
| 5,098,203 | 3/1992 | Henderson | 384/12 |
| 5,228,358 | 7/1993 | Sakino et al. | 74/479 |
| 5,387,995 | 2/1995 | Harig | 359/204 |
| 5,691,825 | 11/1997 | Fujiwara | 250/234 |

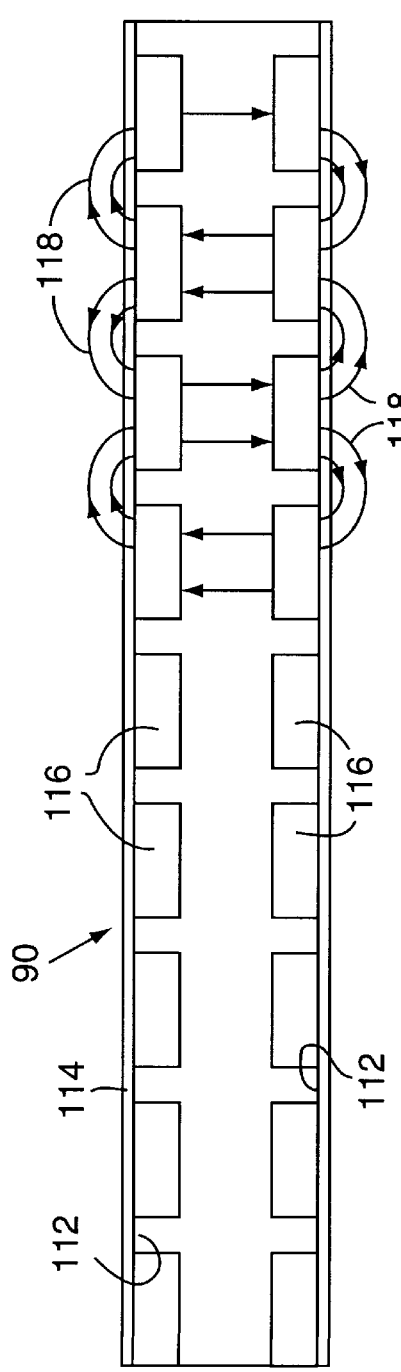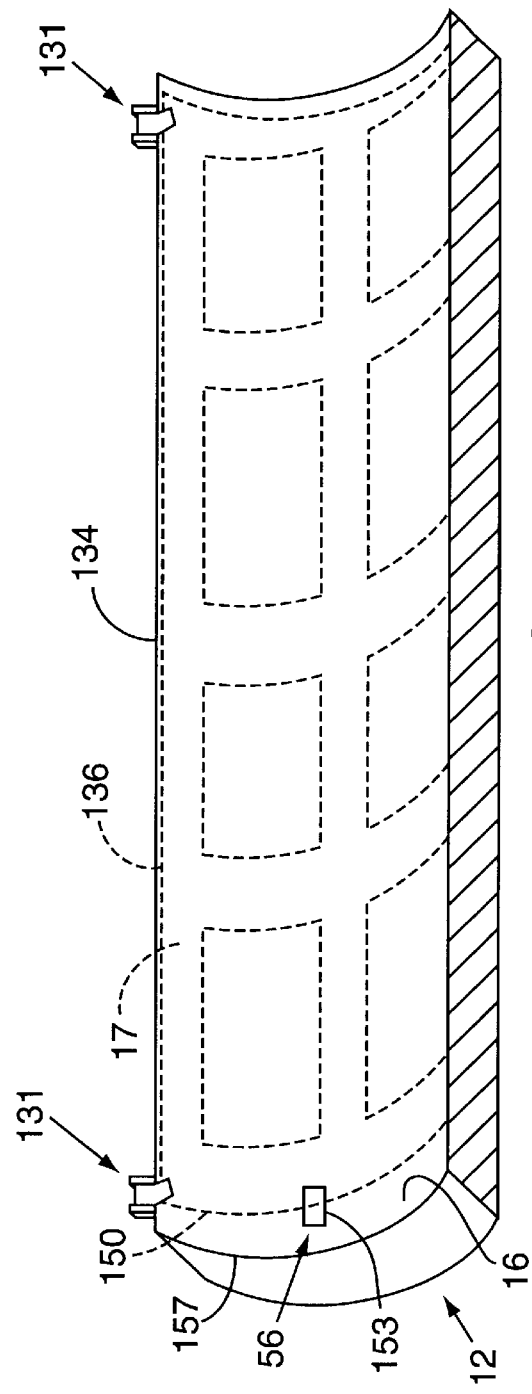

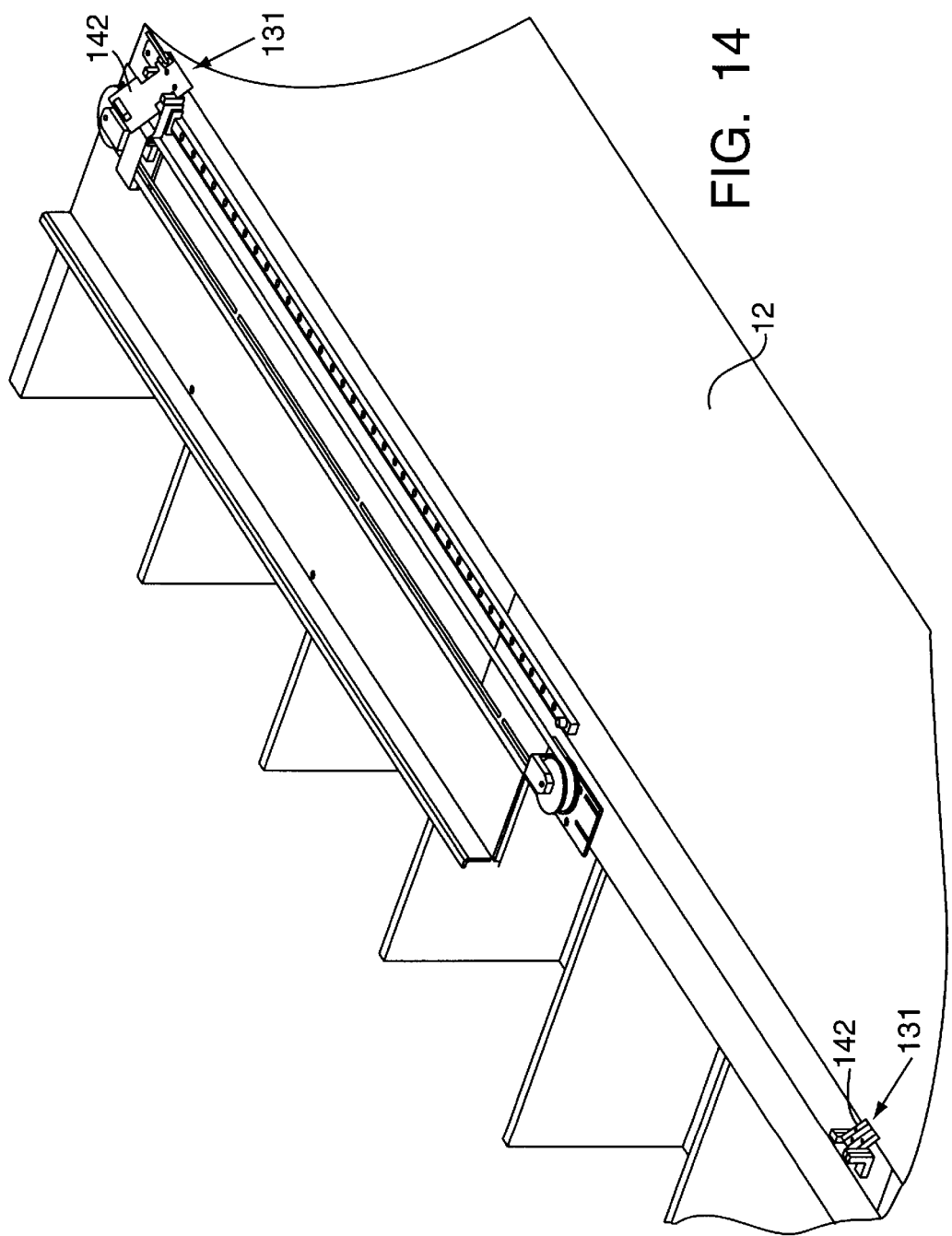

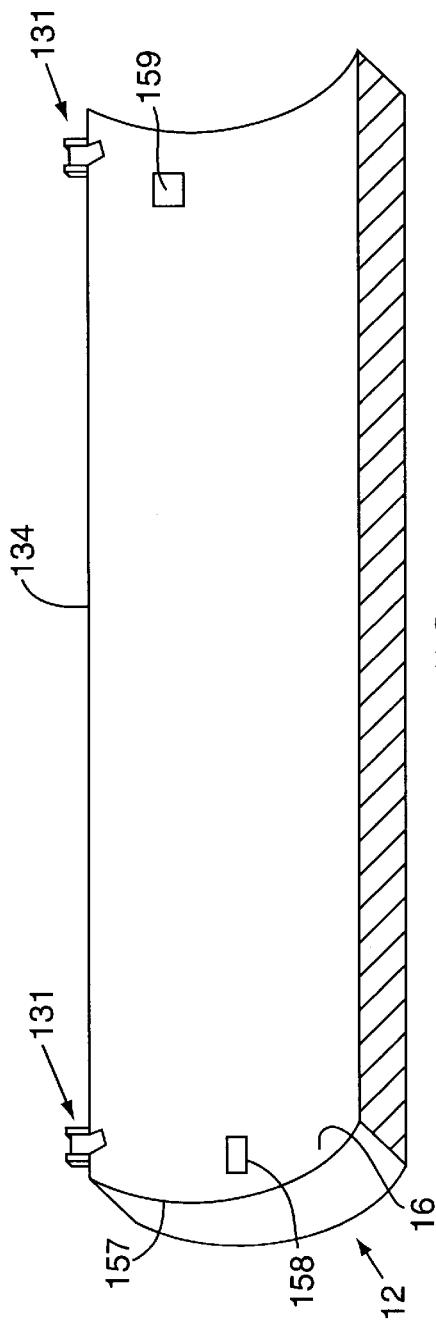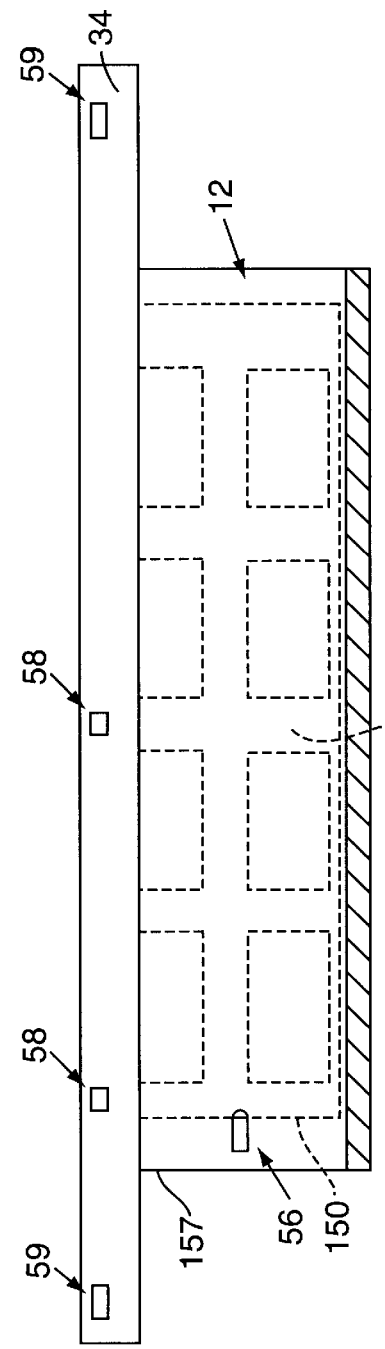

MULTIPLE BEAM SCANNING SYSTEM FOR AN IMAGING DEVICE

FIELD OF THE INVENTION

This invention relates to scanning systems for imaging devices and, more particularly to a beam scanning system for an imaging device including multiple independently controlled scanning assemblies movably coupled to a spar for simultaneously scanning of media.

CROSS REFERENCES TO RELATED APPLICATIONS

Some of the matter contained herein is disclosed in the commonly owned U.S. patent application Ser. No. 08/674, 439, entitled "Apparatus And Method For Positioning A Lens To Expand An Optical Beam Of An Imaging System" (Attorney Docket No. I48–1095) and U.S. pat. application Ser. No. 08/674/766, entitled "A Method And Apparatus For Imaging At A Plurality Of Wavelengths" (Attorney Docket No. I48–1097) and U.S. patent application Ser. No. 08/677, 343, entitled "Method And Apparatus For Generating An Optical Beam For Use In An Imaging System" (Attorney Docket No. I48–1100) and U.S. patent application Ser. No. 08/674,763, entitled "Magnetically Preloaded Air Bearing Motion System For An Imaging Device" (Attorney Docket No. I48–1075) and U.S. patent application Ser. No. 08/844, 668, entitled "Media Feed Apparatus For An Imaging Device" (Attorney Docket No. I48–1121) and U.S. patent application Ser. No. 08/844,267, entitled "Method For Manufacturing A Drum Assembly For An Internal Drum Imaging Device And A Drum Assembly. Each of the foregoing patent applications are incorporated herein by reference.

BACKGROUND OF THE INVENTION

Imaging devices of both planar, external drum and internal drum design, such as photoplotters and scanners, are known in the art. Scanners function by illuminating the test sample with an unmodulated optical beam and capturing the reflected or transmitted light after it leaves the copy. The transmitted or reflected optical signals are received by a detector and recorded.

Photoplotters are used in the field of graphic arts and the fabrication of printed circuit boards. Photoplotters expose a photo-sensitive media plate disposed on an imaging surface by sweeping a modulated optical beam over the media plate. The modulated optical beam is provided by a beam generator.

A planar photoplotter such as are disclosed and claimed in U.S. Pat. No. 4,851,656 and incorporated herein by reference are types of imaging systems which have a planar surface for receiving a substrate or media. An optical exposure head is located on a movable gantry apparatus and is rastered above the media during exposure.

Internal drum devices have a cylindrical surface portion to receive the media. An optical beam generator emits a modulated optical feed beam onto a spinning mirror of a scanning assembly, and the mirror reflects the beam onto the media. As the mirror spins, the reflected imaging beam advances across the media surface from one side edge of the surface to an other side edge thereof, exposing a sequence of pixels which together form a scan line perpendicular to the axis of the drum. The spinning mirror is mounted on a carriage which moves along the axis of the drum, perpendicular to the scan line. The carriage moves continuously so that the imaging process is helical along the cylinder. The rotating imaging beam advances across the surface area of the drum in this manner until the entire image is exposed to the media.

The model Crescent 42 internal drum photoplotter presently manufactured by the assignee of the present invention, Gerber Scientific, Inc., includes a carriage having two generally orthogonal surfaces, which constrain the carriage in two planes, magnetically coupled to a rigid spar that extends along the longitudinal axis of the drum. The carriage is suspended below the spar. A plurality of friction pads formed of polymeric material are secured to the orthogonal surfaces of the carriage for maintaining the carriage a predetermined distance from the spar. A spinner motor and mirror for reflecting the optical beam to the media is mounted to the under surface of the carriage.

The carriage is driven along the spar by a drive system comprising a lead screw and a stepper motor. A motor drive system energizes the stepper motor in minute increments to rotate the lead screw resulting in movement of the carriage along the spar. The motor drive system controls the stepper motor in an open loop mode.

The quality of the imaging with the Crescent 42 photoplotter is limited by the smoothness of the movement of the carriage along the spar. Any variation of the rate of the movement of the carriage results in misplacement of the image and, in the worse case, "banding" or longitudinal lines formed in the media. The combination of the friction between the spar and friction pads, the tolerances in the grinding and lapping of the lead screw, the incremental indexing of the stepper motor, and the lack of feedback of the carriage position all contribute to the variation in the velocity of the carriage.

As detailed hereinabove, the lead screw must be lapped to extremely tight tolerances. Very few manufactures are able to manufacture an acceptable lead screw which is of a length of approximately 42 inches. Typically, a lead screw must be further lapped by hand once received from the manufacturer for assembly in the photoplotter. The tight tolerances and additional hand lapping increase the manufacturing costs of the lead screw.

Another concern in the industry is the cycle time for loading, scanning and unloading each plate of media. A decrease in the time to handle and scan the media plate will increase production of the plates resulting in a reduction in equipment cost, floor space, response time (time to image the first in a series of plates), and manpower requirements. It is particularly valuable to increase the throughput rate of the larger imaging system (68 inch format) which has the longest imaging time and the highest equipment cost. The 68 inch format imaging system is capable of imaging sixteen individual pages of 8.5×11 inch format arranged in a 4 by 4 page layout on a single plate of media.

One limitation to the cycle time of the imaging system having a lead screw drive system for the carriage is that the maximum rate of movement of the carriage along the spar is relatively slow. This slow rate is evidenced by the relatively slow scram or slew rate for returning the carriage back to its initial position which increases the time to unload the scanned media plate after it is scanned.

The majority of the cycle time for a plate of media is the amount of time it takes to scan or image the media, especially for the larger formats. The scan rate of an internal drum imaging system is limited by the rotation rate of the scanning monogon mirror. A typical monogon scan rate is 18,000 rev/min or 300 scans/sec. The time to image a plate is equal to the slow scan travel along the length of the plate multiplied by the imaging resolution divided by the scan rate. This calculation yields an imaging time of 203 sec (3.4 min.), 356 sec (5.9 min.), 576 sec (9.6 min.) for plate lengths of 24, 42, and 68 inches, respectively, at a typical imaging resolution of 2540 scans/inch. If a plate handling time of 60 seconds per load/unload cycle is added to these times; the plate imaging rates would be 13.7, 8.7, and 5.7 plates per hour for plate lengths of 24, 42 and 68 inches, respectively.

Accordingly, it is the general object of the present invention to provide a scanning system for an imaging device that increases the production rate of plates of media.

It is another object to provide a scanning system for an imaging system having multiple independent scanning assemblies for increasing the rate of scanning of the plate of media.

It is a further object to provide a scanning system that has a greater scram or slew rate for reducing the cycle time to unload the scanned plate of media.

It is yet another object to provide a scanning system capable of simultaneously scanning a plurality of images having different imaging parameters on the same plate of media.

It is still another object to provide a scanning system that provides redundancy to enable an imaging device to scan the media if a scanning assembly malfunctions.

It is a further object to provide a scanning system capable of selecting a plurality of types of beam generators to scan the media.

The above and other objects and advantages of this invention will become more readily apparent when the following description is read in conjunction with the accompanying drawings.

SUMMARY OF THE INVENTION

According to the present invention, a controller is provided for an imaging device for scanning media that includes a rigid spar extending the length of and parallel to a central longitudinal axis of a scanning surface; a plurality of scanning assemblies movably coupled to the spar for reflecting respective optical beams to media releasably secured to the scanning surface, a plurality of beam generators for emitting modulated optical beams to expose the media; and a plurality of corresponding motor drive systems for energizing a corresponding motor to move each respective scanning assembly along the spar. The controller comprises means for receiving a position error signal representative of the difference between a zero reference position and the actual position of the media disposed on the scanning surface, and means for receiving position signals representative of the location of a respective scanning assembly along the spar. The controller further comprises means for generating drive signals provided to each respective motor drive system for moving independently each scanning assembly to a respective predetermined home position on the spar in response to an initialization signal and the position signals and for moving independently each scanning assembly at a predetermine velocity a predetermined distance along the spar in response to an initiate scanning signal. Furthermore, the controller comprises means for providing a plurality of digital signals representative of an image to be scanned to the media, in response to the position signals and position error signal, to each respective optical beam generator, whereby each optical beam generator emits a modulated optical beam to a respective scanning assembly for reflecting the optical beam to the media as the scanning assemblies travel the predetermined distance along the spar at a predetermined location on the media.

In another embodiment of the present invention, a controller is provided for an imaging device for scanning media that includes a rigid spar extending the length of and parallel to a central longitudinal axis of a scanning surface; a plurality of beam receivers for generating imaging signals representative of the image disposed on the media; a plurality of scanning assemblies movably coupled to the spar for reflecting respective optical beams from the media to a respective beam receiver; and a plurality of corresponding motor drive systems for energizing a corresponding motor to move each respective scanning assembly along the spar. The controller comprises means for receiving a position error signal representative of the difference between a zero reference position and the actual position of the media disposed on the scanning surface; and means for receiving position signals representative of the location of a respective scanning assembly along the spar. The controller further comprises means for generating drive signals provided to each respective motor drive system for moving independently each scanning assembly to a respective predetermined home position on the spar in response to an initialization signal and the position signals; and for moving independently each scanning assembly at a predetermine velocity a predetermined distance along the spar in response to an initiate scanning signal. Furthermore, the controller comprises means for receiving a plurality of digital signals representative of the image disposed on the media provided by each respective optical beam receiver, whereby each respective scanning assembly reflects each optical beam from the media to each respective optical beam receiver as the scanning assemblies travel the predetermined distance along the spar at a predetermined location on the media.

In another embodiment, a scanning assembly for an imaging device, such as a photoplotter and a scanner, is adapted to turn an optical beam between a scanning surface and a beam processor that is disposed off of a central longitudinal axis of the scanning surface. The imaging device includes a rigid spar extending the length of and parallel to the longitudinal axis of the scanning surface; and a controller for generating drive signals to move the scanning assembly along the spar at a preferred rate. The scanning assembly comprises a carriage having a pair of engagement surfaces movably coupled to the spar; a scanning means secured to said carriage disposed axially to the longitudinal axis of the scanning surface; and an optical periscope mounted to said carriage for reflecting the optical beam between the optical beam processor and the scanning means. The scanning means reflects the optical beam between said optical periscope and the scanning surface.

In still another embodiment, a scanning system for an imaging device, such as a photoplotter and a scanner, includes a scanning surface for securing the media thereto; and a rigid spar extending the length of and parallel to a central longitudinal axis of the scanning surface. The scanning system comprises a plurality of beam processors for each of a plurality of optical beams; and a plurality of scanning assemblies movably coupled to the spar for reflecting respective optical beams between each beam processor and the media. The scanning system further comprises a controller for generating independent drive signals to move each of the scanning means along the spar at a preferred rate, and for processing each of the optical beams.

In another embodiment, an imaging device for scanning an image, such as a photoplotter and scanner, to media comprises a scanning surface for securing the media thereto;

and a rigid spar extending the length of and parallel to a central longitudinal axis of the scanning surface. The imaging device further comprises a plurality of scanning assemblies movably coupled to the spar for reflecting respective optical beams; and a plurality of beam processors for each of a plurality of optical beams. Furthermore, the imaging device includes a controller for generating independent drive signals to move each of the scanning assemblies along the spar at a preferred rate, and for processing each of the optical beams.

In another embodiment, a method of scanning media secured to a scanning surface of an imaging device that includes a rigid spar extending the length of and parallel to a central longitudinal axis of the scanning surface. The imaging device also has a plurality of scanning assemblies movably coupled to the spar for reflecting respective optical beams to the media. Furthermore, the imaging device has a plurality of beam generators for emitting modulated optical beams to expose the media; and a controller for generating independent drive signals to move each of the scanning means along the spar at a preferred rate, and for generating digital signals representative of the image to be scanned. The method comprises the steps of releasably securing the media onto the scanning surface; generating a position error signal representative of the difference between a zero reference position and the actual position of the media; and moving independently each scanning assembly to a respective predetermined home position disposed on the media in response to the position error signal. The method further includes the steps of then moving independently each scanning assembly at a predetermined velocity for a predetermined distance along the spar; and generating a plurality of modulated optical beams representative of an image. Furthermore, the method comprises the steps of emitting simultaneously each optical beam to a respective scanning assembly for reflecting the optical beam to the media as the scanning assemblies travel the predetermined distance along the spar.

In another embodiment of the present invention, a method of scanning media secured to a scanning surface of an imaging device that includes a rigid spar extending the length of and parallel to a central longitudinal axis of the scanning surface. The imaging system further includes a plurality of beam receivers for generating imaging signals; a plurality of scanning assemblies movably coupled to the spar for reflecting respective optical beams from the media to a respective beam receiver; and a controller for generating independent drive signals to move each of the scanning means along the spar at a preferred rate, and for generating digital signals representative of the imaging signals provided by the optical beam receivers. The method comprises the steps of securing the media onto the scanning surface; generating a position error signal representative of the difference between a zero reference position and the actual position of the media. The method further comprises the steps of moving independently each scanning assembly to a respective predetermined home position disposed on the media in response to said position error signal; moving independently each scanning assembly at a predetermined velocity for a predetermined distance along the spar; and generating a plurality of beams representative of the image disposed on the media. Furthermore, the method comprises reflecting simultaneously each optical beam to a respective scanning assembly for reflecting the optical beam to a respective optical beam receiver as the scanning assemblies travel the predetermined distance along the spar.

BRIEF DESCRIPTION OF THE DRAWINGS

FIG. 10 is a top plan view of a portion of the magnetic track assembly of the linear motor for the imaging device of FIG. 1.

FIG. 13 is a perspective view of the internal drum and a plate of scanned media (shown in phantom) partially broken away.

FIG. 14 is a perspective view of a pair of docking sensors and the internal drum partially broken away.

FIG. 18 is a perspective view of an alternative embodiment of photodetection device in accordance with the present invention.

FIG. 23 is a side elevational view of the spar, internal drum and a plate of scanned media (shown in phantom) partially broken away.

DETAILED DESCRIPTION OF THE PREFERRED EMBODIMENTS

Figure 1:
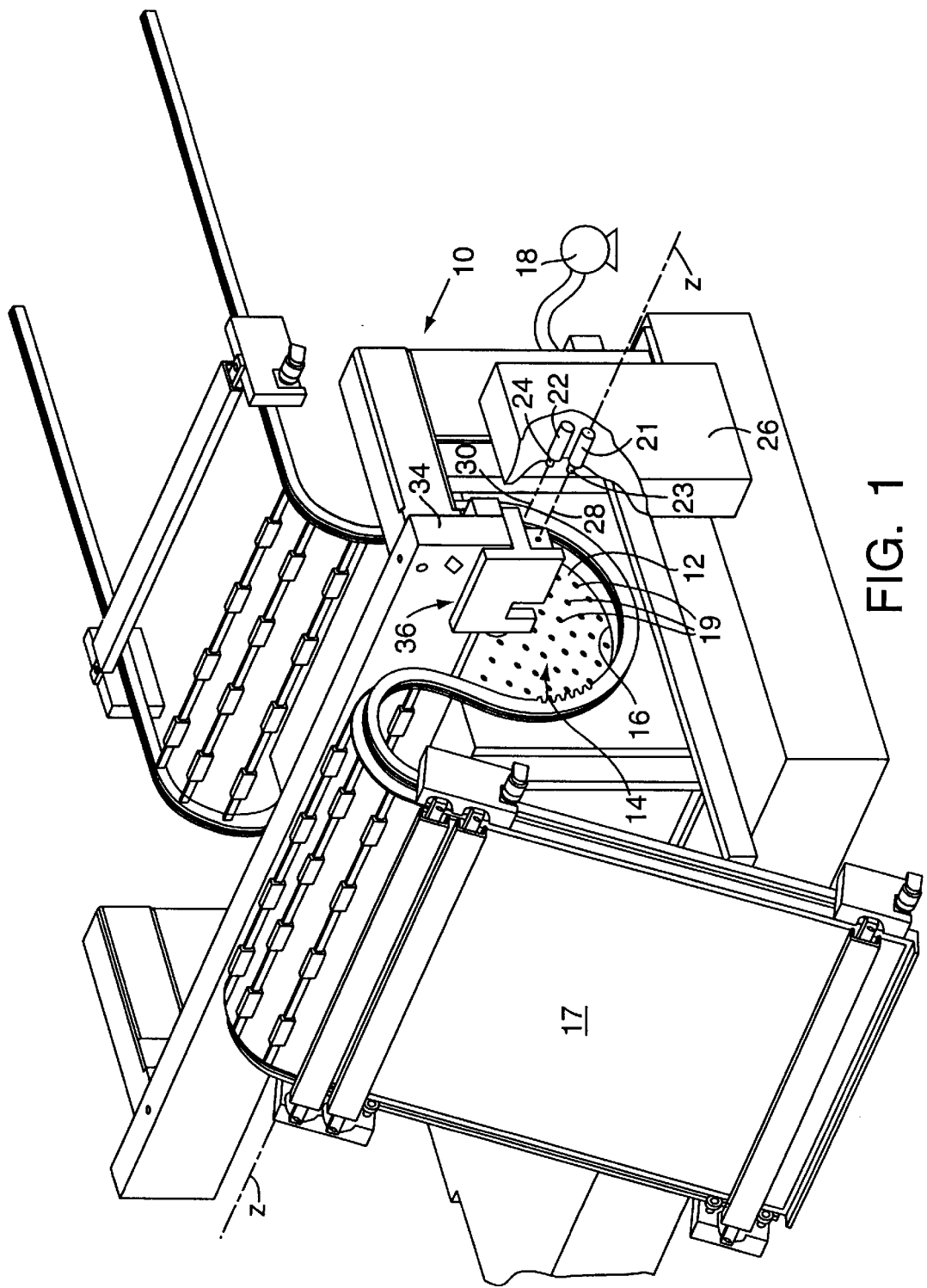
FIG. 1 is a perspective view of a preferred embodiment of an imaging device having a scanning system in accordance with the present invention.

FIG. 1 illustrates an imaging device generally designated 10, embodying this invention adapted for reflecting or turning an optical beam between a scanning surface and an optical beam processor 21,22, such as an optical beam generator for a photoplotter and an optical beam receiver for a scanner. Photoplotters expose a photosensitive media plate 17 disposed on an imaging surface by sweeping a modulated optical beam generated by a beam generator over the media plate. Scanners function by illuminating the test sample with an unmodulated optical beam and capturing the reflected light by the beam receivers. The following description of the imaging device shown in FIG. 1 pertains to a photoplotter, however, one skilled in the art would recognize that the present invention may also pertain to a scanner.

The imaging device 10 includes a portion of a cylinder, generally crescent-shaped drum 12 defining an exposure chamber 14. The interior surface 16 of the drum 12 defines an internal support structure for supporting a media sheet or plate 17 within the exposure chamber 14 in a given orientation to a point along the central axis z of the internal drum. The media sheets 17 may be a sheet of aluminum or polymer, such as polyester, having a photosensitive emulsion coated on one surface thereof or a sheet of photosensitive film. A plurality of apertures 19 defined by the support surface 16 of the internal drum 12 are provided for the purpose of drawing the plate or sheet 17 down onto the support surface under vacuum pressure applied by a vacuum generator 18 and associated manifold system (not shown) disposed below the drum in the lower portion of the structure.

Figure 2:
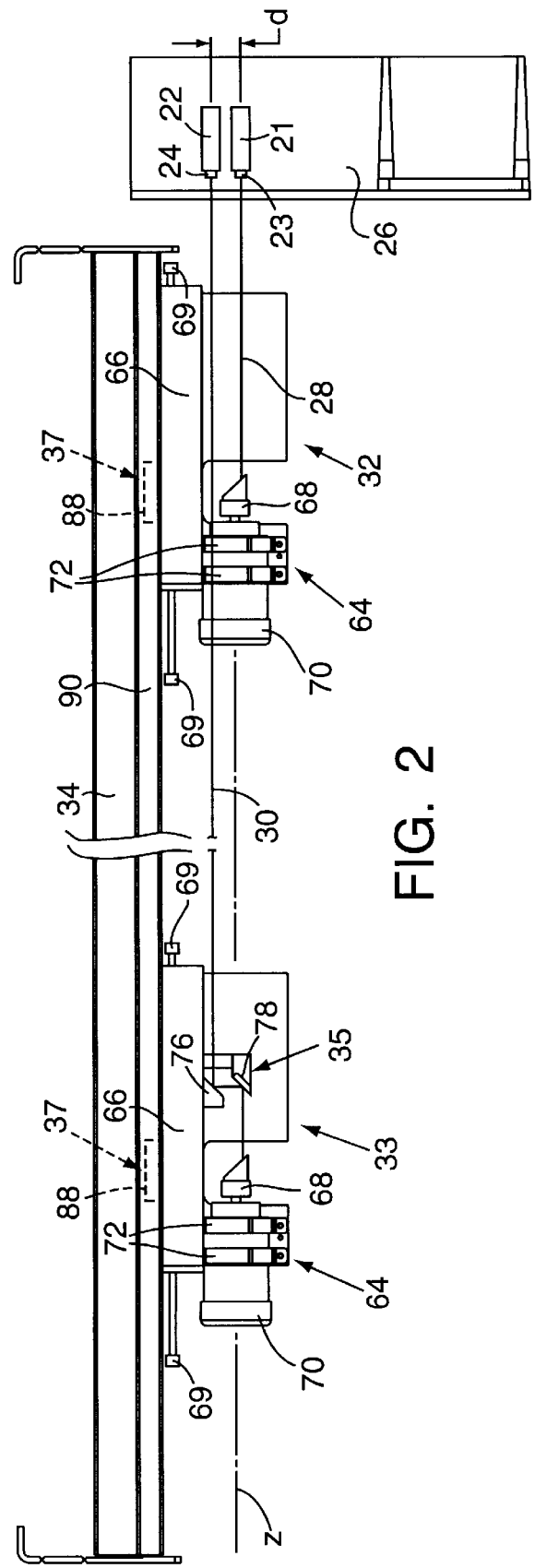
FIG. 2 is an expanded, side elevational view of the scanning assemblies, beam generators and spar of the scanning system of the imaging device of FIG. 1.

The photoplotter 10 further includes a pair of optical beam generators 21, 22, such as a laser diode, and beam forming optics 23, 24 secured to a frame structure 26. In a preferred embodiment, the beam generators 21,22 are disposed at one end of the internal drum 12, as shown in FIGS. 1 and 2. Each of the optical beams 28, 30 are received and reflected to the media 17 by a corresponding forward and rearward scanning assembly 32, 33, respectively, slidably coupled to a spar 34 which extends parallel to the central axis z of the internal drum 12. The spar 34 extends beyond the outer edges of the internal drum 12 to park the scanning assemblies away from the exposure chamber 14 to permit easier loading of the media 17.

One optical beam 28 is emitted from beam generator 21 through the beam forming optics 23 and is directed or reflected coincidentally along the central axis z of the internal drum 12. Another optical beam 30 is emitted from beam generator 22 through the beam forming optics 24 and is directed or reflected parallel to and offset a predetermined distance d from the central axis z of the internal drum 12 to avoid interference by the forward scanning assembly 32 disposed intermediate of the beam generator 22 and rearward scanning assembly 33. To provide the offset optical beam 30 axially with the internal drum 12, the rearward assembly includes an optical periscope 35 to redirect the offset beam coincidentally with the central axis z of the drum. A controller 20 independently modulates each of the optical beams 28, 30 in response to digital signals of images provided by a raster image processor 31 (See FIG. 3).

Figure 6:
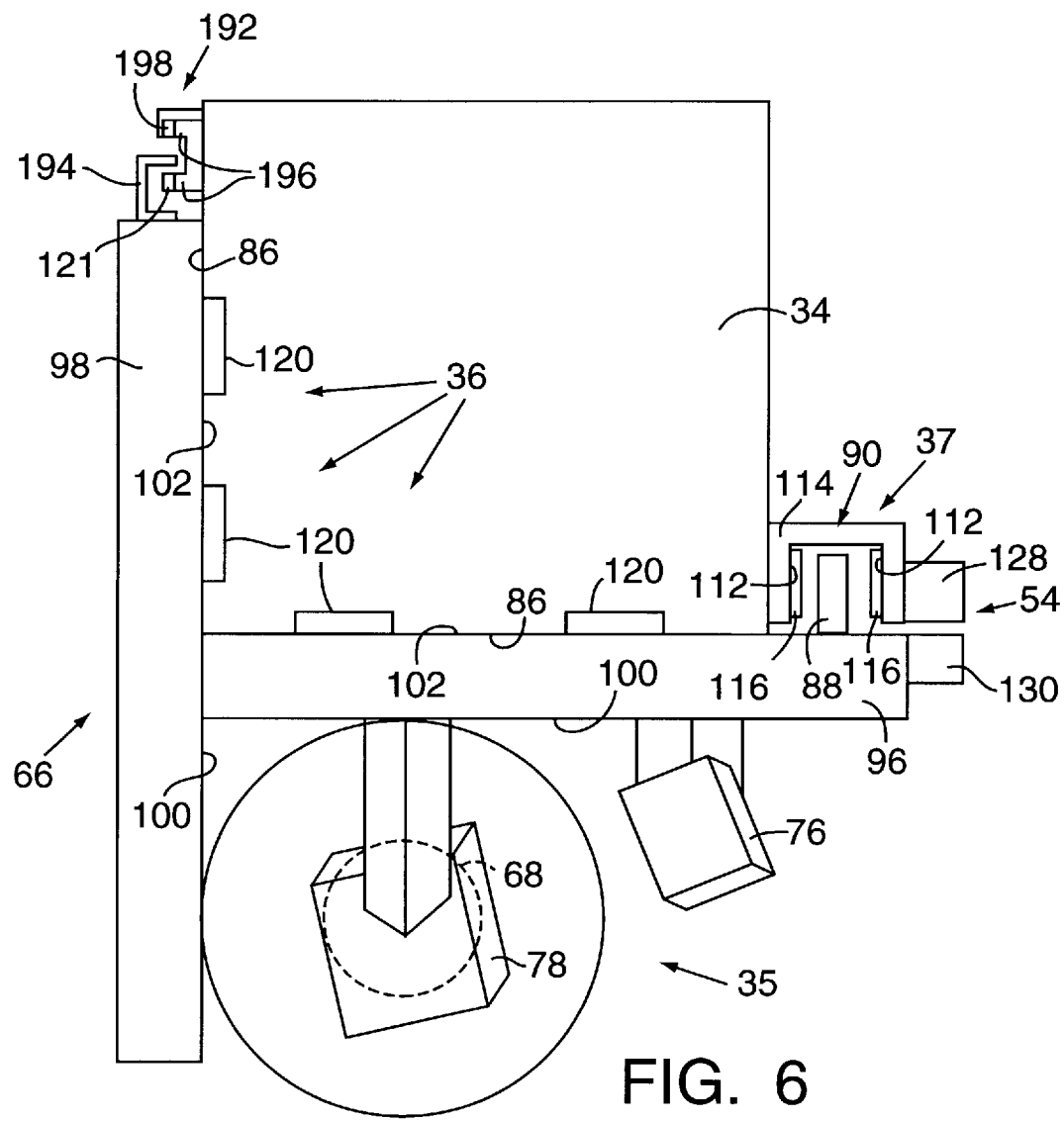
FIG. 6 is a front elevational view of a scanning assembly and spar of the imaging device of FIG. 1.
Figure 9:
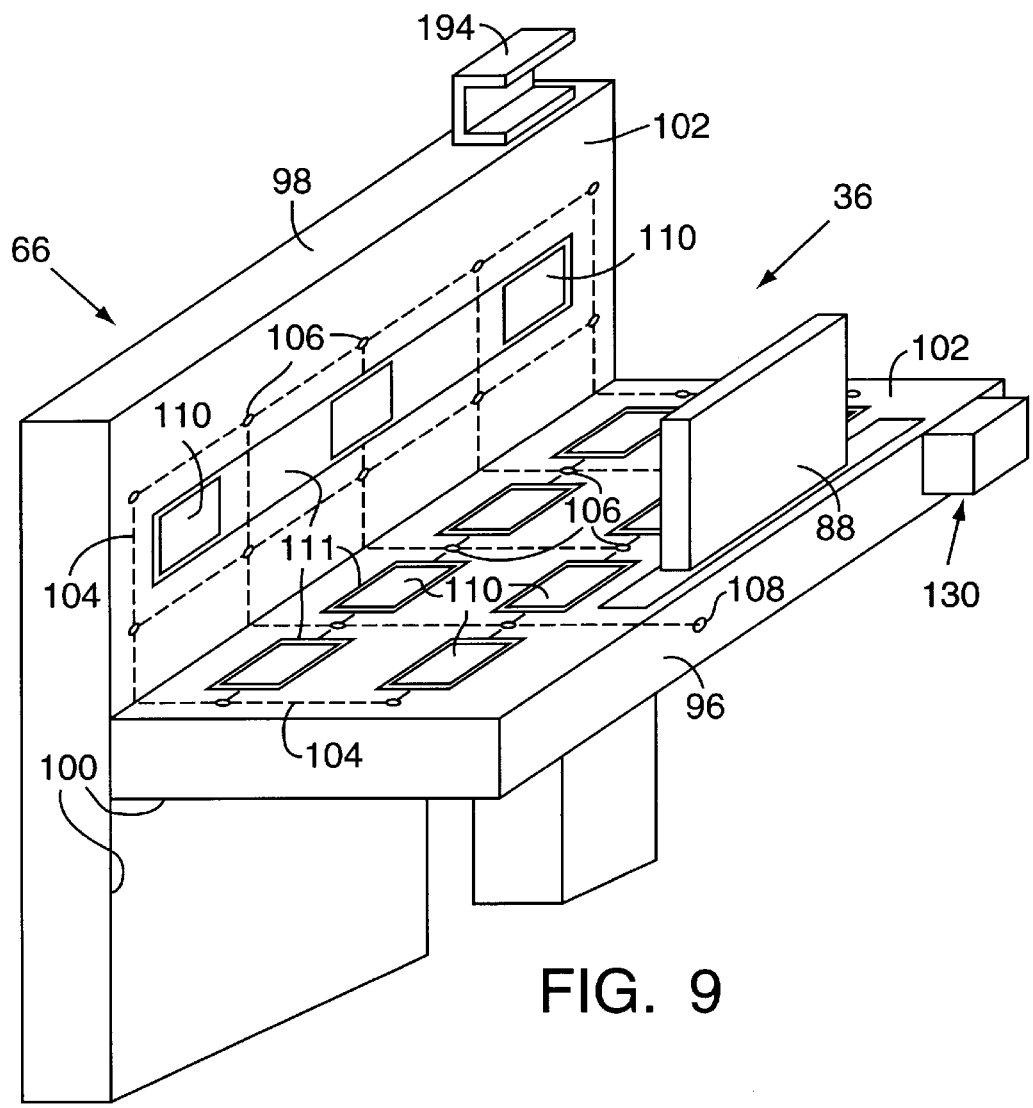
FIG. 9 is a perspective view of the carriage of the motion system of the imaging device of FIG. 1 showing the upper surfaces of the carriage.

Referring to FIGS. 6 and 9, the scanning assemblies are independently driven along the spar 34 by a magnetically preloaded air bearing motion system 36 similar to the one disclosed in Applicant's co-pending U.S. patent application Ser. No. 08/674,763 entitled "Magnetically Preloaded Air Bearing Motion System For An Imaging Device" (Attorney Docket No. I48–1075) which is incorporated herein by reference. The motion system 36, which includes linear motors 37, makes it possible to independently control a plurality of scanning assemblies 32, 33 along a single spar 34. The linear motors 37,37, as compared to multiple lead screws, permit an $n^{th}$ number of scanning assemblies slidably disposed along the spar 34. In the alternative, each scanning assembly 32,33 may be driven by an independent stepper motor and lead screw, however, the rate of speed of the scanning assemblies would be much slower and only a limited number of scanning assemblies may be disposed along the spar 34 as a result of the size of the lead screws and stepper motors.

Figure 3:
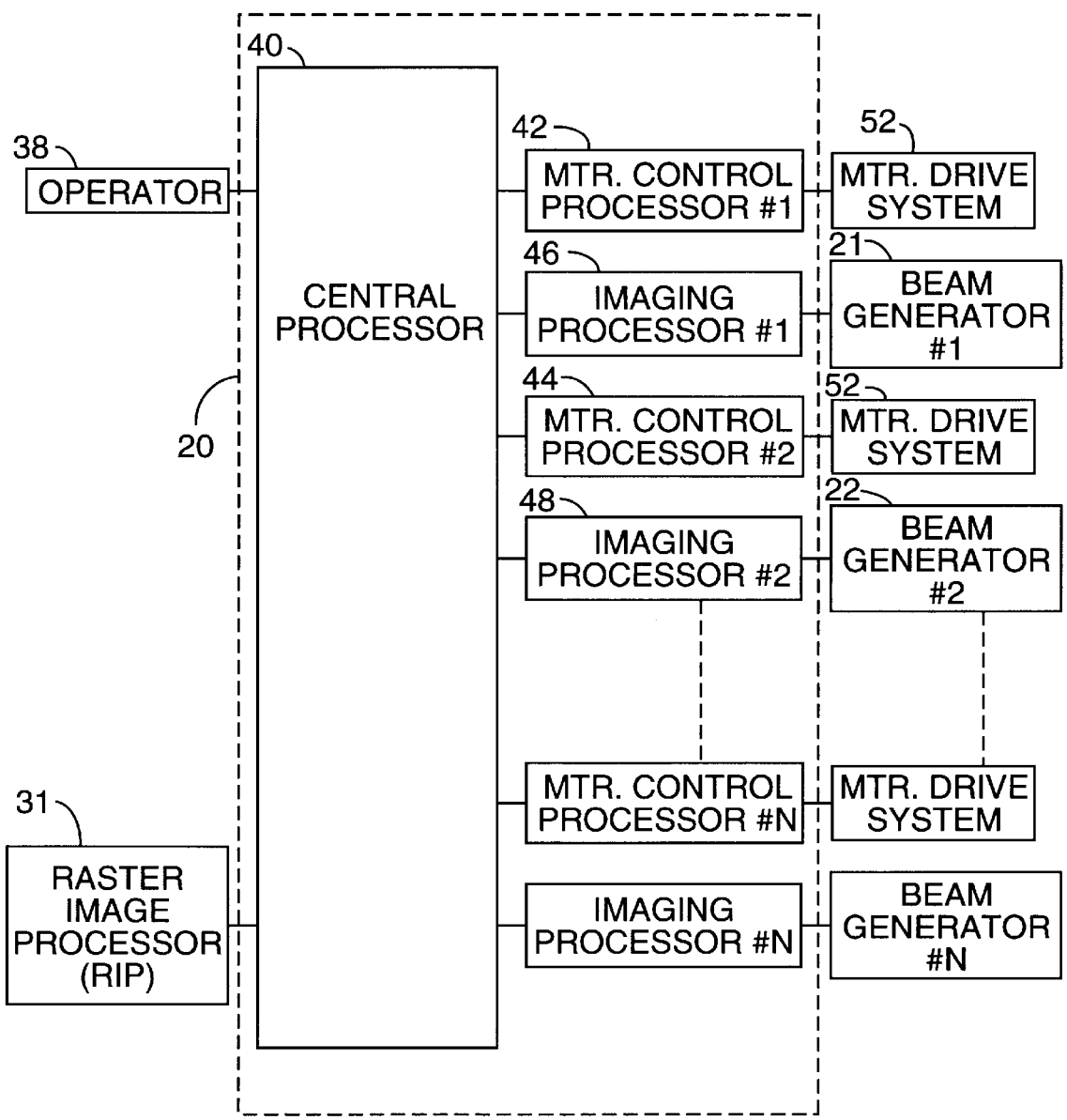
FIG. 3 is a schematic functional diagram of a portion of the scanning system of the imaging system of FIG. 1.

Referring to FIG. 3, the controller 20 provides signals in response to inputs by the operator 38 for independently driving the scanning assemblies 32, 33 along the spar 34 and independently modulating each of the optical beams 28, 30 emitted by the beam generators 21, 22. This capability of independently controlling the beam generators and scanning assemblies permits a plurality of images to be scanned simultaneously onto the media 17 thus reducing the time for scanning each plate of media, especially larger 16-up media, and thereby increase media plate production.

The controller includes a central processor 40 and a plurality of motor control processors 42,44 and imaging processors 46,48. The central processor 40 coordinates the movement of the scanning assemblies 32,33 along the spar 34 according to an algorithm and inputs from the operator 38, such as the type and parameters of the media 17, the number of scanning assemblies used for imaging, and parameters of the image to be scanned onto the media. The central processor 40 provides carriage control signals to the motor control processors 42,44 for independently moving each of the scanning assemblies 32,33 respectively. Each motor control processor senses the position of each scanning assembly and provides a motor control signal to move each assembly to a desired position along the spar 34 at a predetermined rate of speed for each step of the scanning process.

The central processor 40 also monitors the position of each of the scanning assemblies 32,33 along the spar 34 to avoid collisions of the scanning assemblies. If the space between a pair of scanning assemblies are within a predetermined distance, the central processor 40 alters or removes the carriage control signal to the motor control processors 42,44 to prevent the scanning assemblies from contacting each other.

Each motor control processor 42,44 provides a motor control signal to a motor drive system 52 for energizing the linear motor 37 of a corresponding scanning assembly 32,33. Each motor control processor 42,44 then commands its respective linear motor 37,37 to move each scanning assembly to a position at the predetermined rate in response to the carriage control signals provided by the central processor 40 and the outputs of the respective linear encoder 54,54, photodetection device 56 and position switches 58,59 (see FIG. 11).

Referring to FIG. 3, the central processor 40 further stores the digital signals received by one or more RIPs 31 and provides the stored digital signals to each of the imaging processors 46,48 in accordance to the number of RIPs used and the parameters of the media 17 being scanned. For example, if digital signals of a single RIP 31 are provided to the central processor 40, the central processor stores the data in memory and apportions the stored signals between each of the beam generators 21,22 designated by the operator 38 to scan the image onto the media 17. Depending upon the parameters of the media, the stored digital signals are apportioned such that each beam generator 21,22 scans a complete image or page to prevent stitching of the scanned image. Stitching occurs when two abutting scanned images do not properly align and therefore, create a discontinuity in the image at the abutting edges of the images. If one scanning assembly 32,33 is designated to scan the entire plate of media 17, then the entire stored digital signals is provided to the corresponding beam generator.

Figure 4:
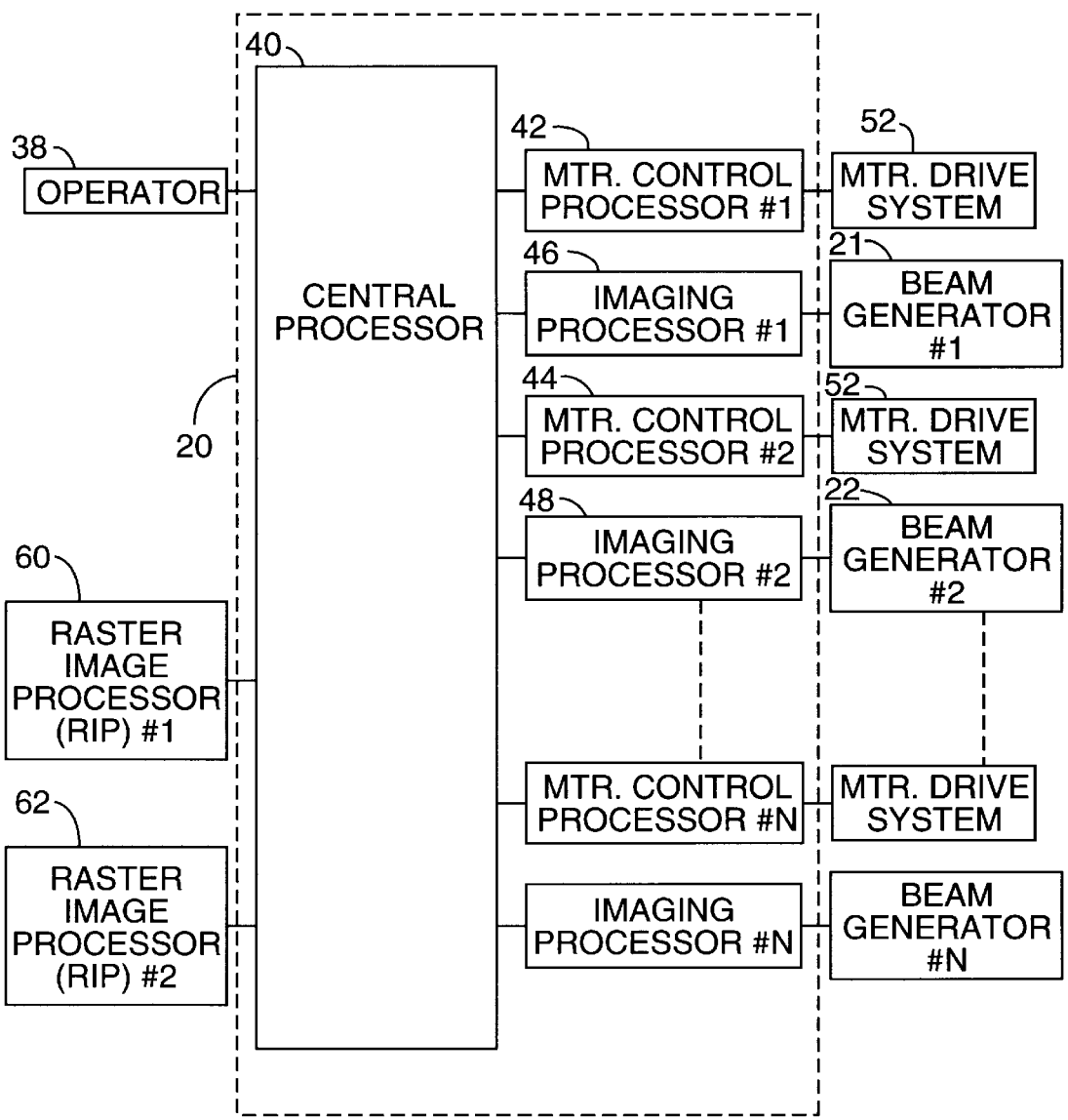
FIG. 4 is a schematic functional diagram of a portion of the scanning system of an alternative embodiment of the imaging system of FIG. 1.

In an alternative embodiment shown in FIG. 4, the digital signals representing the images to be scanned are provided by a plurality of RIPs 60,62. The central processor 40 may separately store the digital signals provided by each RIP. The central processor may then simply provide the stored digital signals for each RIP 60,62 to a corresponding beam generator 21,22 without having to apportion the stored signals to their respective imaging processor 46,48. For example, if two scanning assemblies 32,33 and optical beam generators 21,22 are used to image the media 17, a pair of corresponding RIPs 60,62 provide digital signals of an image to the central processor 40 that are specifically dedicated to each of the two beam generators.

Each imaging processor 46,48 provides imaging signals to each respective optical beam generator 21,22 that are representative of the stored digital signals provided by the central processor 40. Each imaging processor commands the corresponding beam generator to emit a modulated optical beam 28,30 of predetermined parameters provided by the operator 38, such as the wavelength, spot size and resolution. The operator 38 may provide independent parameters for each of the beam generators 21,22 thus enabling each optical beam 28,30 to scan the images at different resolutions and/or spot size in both the fast scan and slow scan directions.

Figure 5:
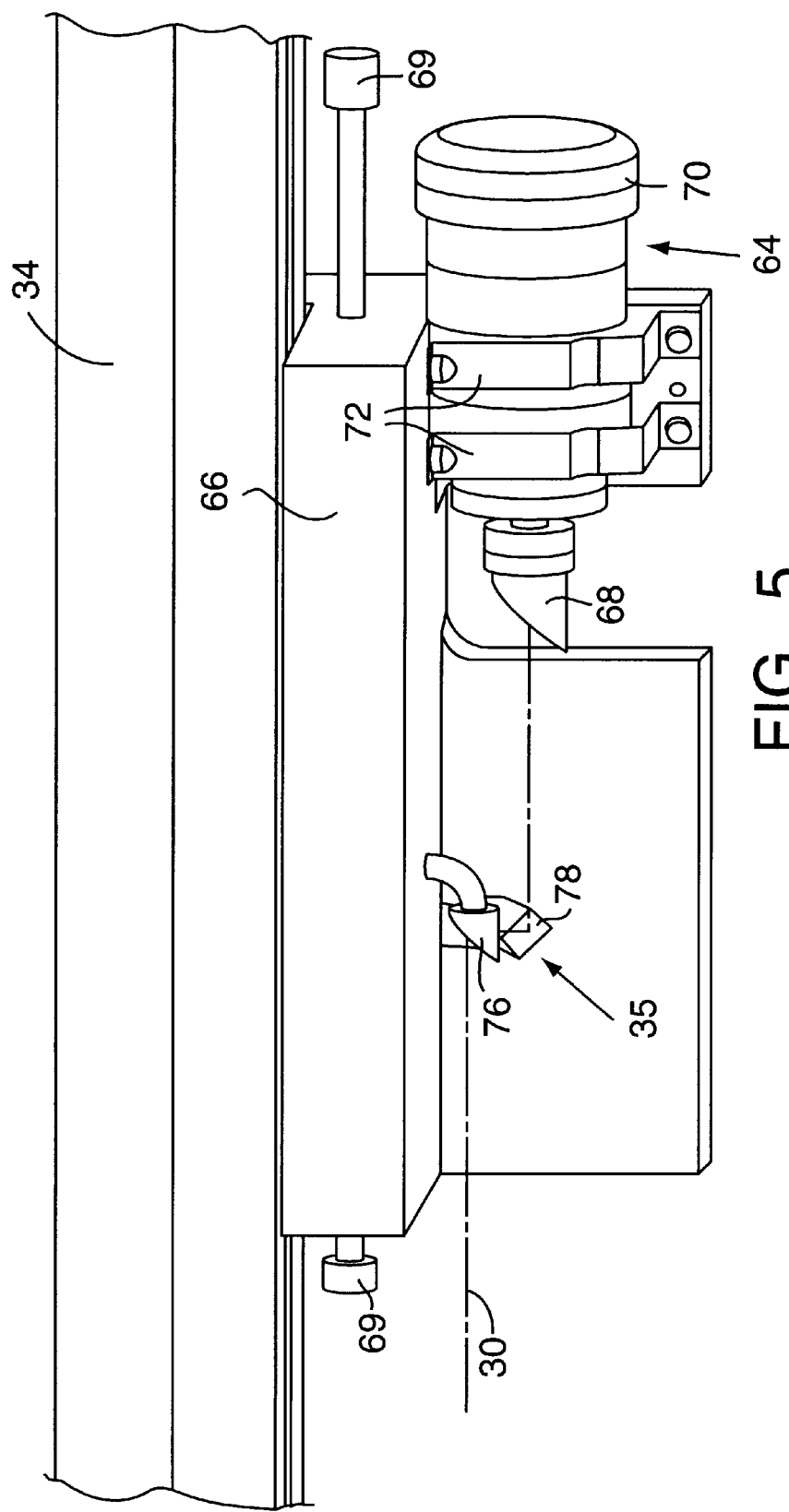
FIG. 5 is an expanded, front perspective view of the scanning assembly and spar of the scanning system of the imaging device of FIG. 1.

As shown in FIGS. 2 and 5, each of the scanning assemblies 32, 33 comprises a spinner assembly 64 mounted to a carriage 66 suspended from the spar 34 above the internal drum 12. The spinner assembly 64 includes an off-axis parabolic mirror 68 mounted to a spinner motor 70 which is mounted to the carriage by a pair of straps 72 such that the parabolic mirror 68 faces their respective beam generator 21,22 and is coaxial with the central axis z of the internal drum 12. The scanning assemblies 32,33 turn the optical feed beam substantially orthogonal toward the support surface 16, focused on the emulsion coated surface of the media 17, and swept through a given arc across the surface in raster format. Each sweep ol the optical beams 28,30 across the media 17 forms a scan line of a sequence of pixels. The rate of rotation of the parabolic mirror 68 is in the range of 12,000 to 24,000 rotations per minute.

The scanning assemblies 32,33 further include a pair of bumpers 69 mounted at each end for protecting the scanning assemblies if they should collide. The ends of the bumpers 69 are formed of rubber material to absorb the shock and eliminate or reduce any damage.

Referring to FIGS. 2, 5 and 6, the rearward scanning assembly 33 further includes an optical periscope 35 mounted to the carriage for reflecting or routing the off-axis optical beam 30 axially with the central axis z of the internal drum. In a preferred embodiment, the periscope 35 includes an outer mirror 76 disposed axially with the off-axis optical beam 30 at a 45 degree angle to reflect the beam orthogonal to an inner mirror 78. The inner mirror 78 is mounted at a 45 degree angle and axially to the central axis z of the internal drum to receive the reflected optical beam 30 and reflect that beam axially to the spinner mirror 68. One skilled in the art will recognize that the mirrors 76,78 may be set at any angle provided the optical beam is reflected axially to the axis z of the drum 12.

Figure 7:
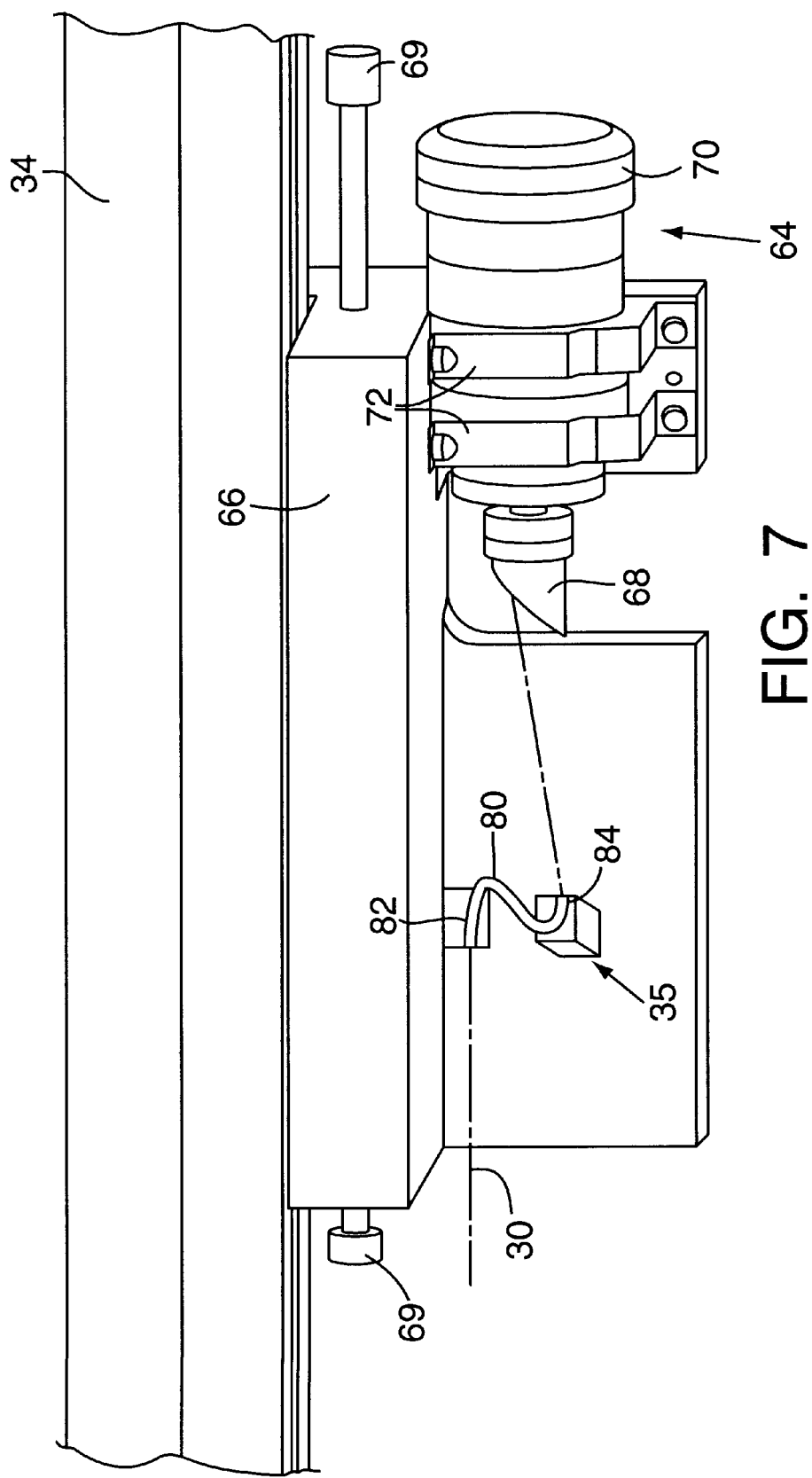
FIG. 7 is an expanded, front perspective view of an alternative embodiment of an optical periscope of a scanning assembly provided in accordance with the present invention.

In an alternative embodiment shown in FIG. 7, the optical periscope 35 comprises a high-grade optical glass 80 (i.e., BK7) having an outer end 82 mounted axially to the off-axis optical beam 30 and an inner end 84 mounted axially with the central axis z of the internal drum 12. The optical beam 30 enters the optical glass 80 at the outer end 82 and is emitted from the inner end 84 of the fiber optic 80 to the spinner mirror 68.

The amount of displacement d (see FIG. 2) of the off-axis optical beam 30 from the central axis z of the internal drum is selected to permit the off-axis optical beam, at its greatest diameter, to pass the forward scanning assembly 32 without obstruction. For example, an optical beam, having its greatest diameter of 25 millimeters (mm) and the spinner assembly having an outer diameter of 80 mm requires a displacement of at least 54 mm. Furthermore, the optical beam 30 must also be disposed above the exposure chamber to prevent interference with the rotating imaging beam of the forward scanning assembly 32.

Figure 8:
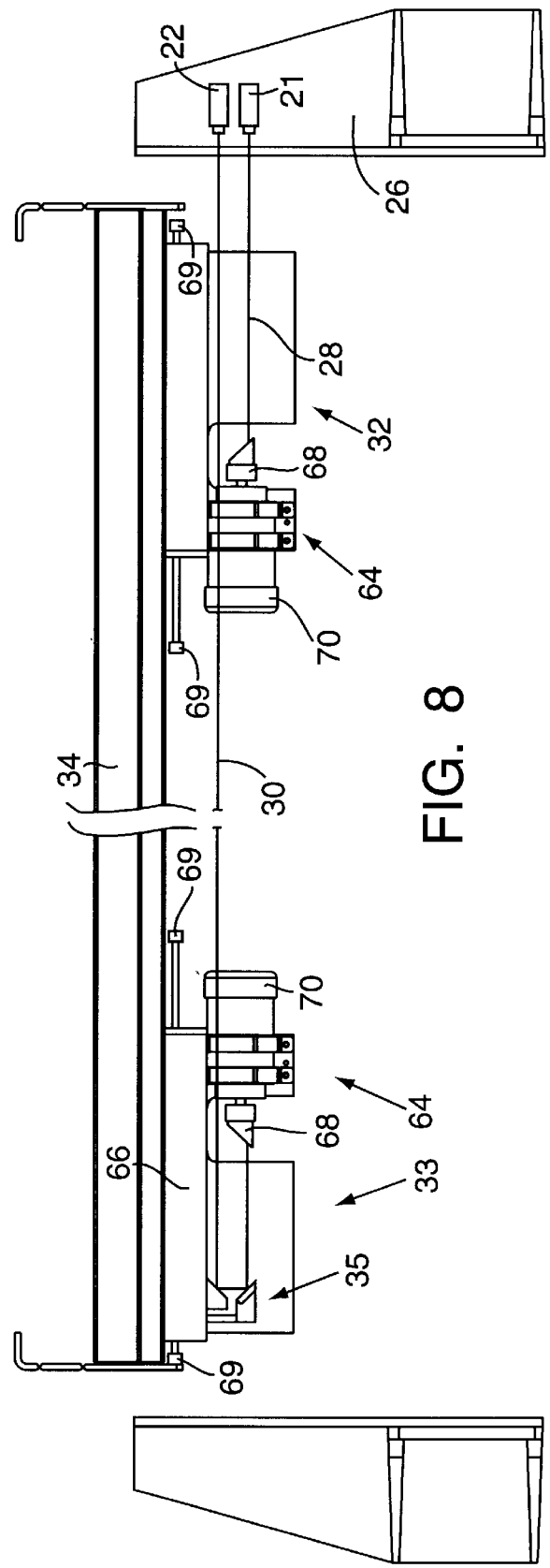
FIG. 8 is an expanded, side elevational view of a first alternative embodiment of scanning assemblies, beam generators and spar of a scanning system provided in accordance with the present invention.

As shown in FIGS. 1 and 2, the scanning assemblies 32,33 are preferably oriented to face in the same direction towards the optical beam generators 21,22 so that all the scanning assemblies spin in the same direction which permits data clock generation electronics to be identical for both scanning assemblies. One skilled in the art would recognize, however, that the rearward scanning assembly 33 may face in the opposite direction than the forward scanning assembly 32, as shown in FIG. 8, without departing from the present invention. In this alternative embodiment, the periscope 35 of the rearward scanning assembly 33 directs the off-axis optical beam 30 orthogonal back towards the spinner mirror 68.

Figure 12:
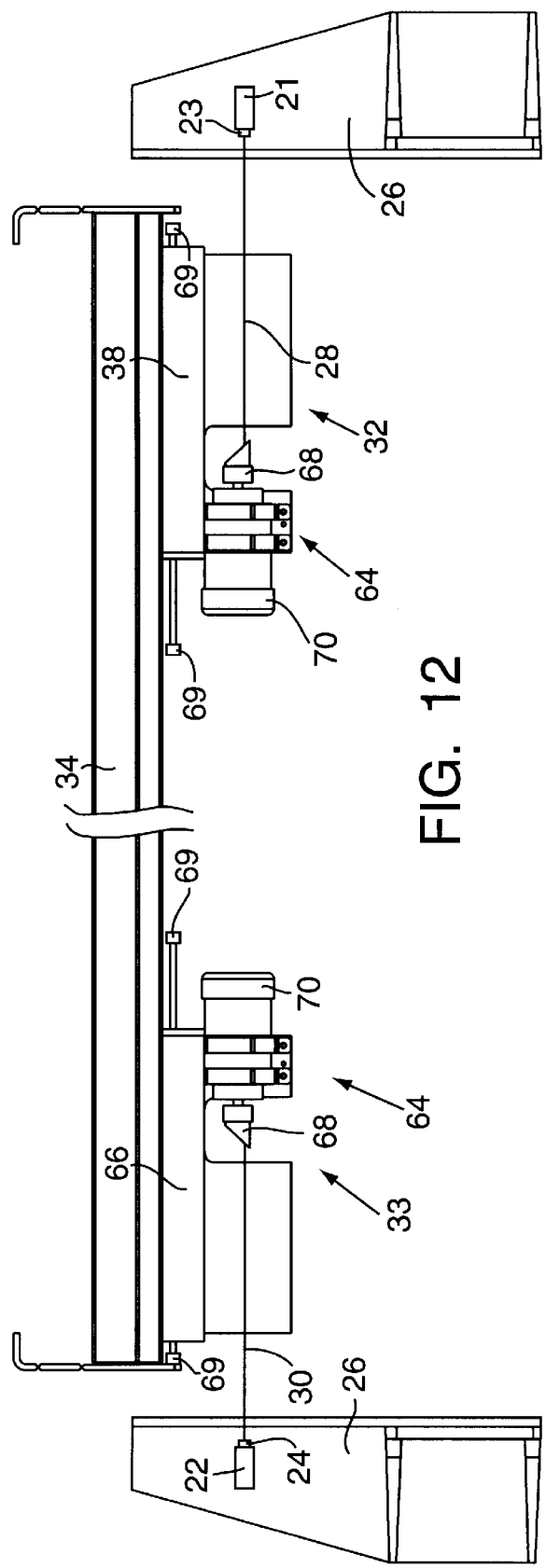
FIG. 12 is an expanded, side elevational view of second alternative embodiment of scanning assemblies, beam generators and spar of a scanning system provided in accordance with the present invention.

In an another alternative embodiment shown in FIG. 12, the optical beam generators 21,22 and respective beam forming optics 23,24 are disposed at opposing ends of the internal drum 12. Both optical beams 28,30, which are emitted from the beam generators 21,22 through the beam optics 23,24, are directed coincidentally along the central axis z on the internal drum 12 but in opposite directions. The controller 20 independently modulates each of the optical beams in response to the digital signals of images provided by the raster image processor (RIP). Each of the optical beams 28,30 are received by a corresponding scanning assembly 32,33 slidably coupled to the spar 34. Each of the scanning assemblies is the same as previously described, except the rearward scanning assembly 33 does not include an optical periscope 35 (See FIG. 2). The scanning assemblies face in opposite directions so that each spinner assembly 64 receives a corresponding optical beam 28,30 emitted from one end of the drum 12. The operation of the alternative embodiment is substantially the same as described, except the controller must compensate for the opposing rotation of the spinner motors 70 mounted to the scanning assemblies 32,33.

As shown in FIGS. 6 and 9, the carriage assemblies 66 are coupled by magnetically preloaded air bearing motion systems 36 to the spar 34 having a pair of precision ground or lapped surfaces 86, 86. The movement of the carriages 66 along the spar 34 is provided by a linear motor 37 mounted to each carriage and the spar 34. The linear motor 37 includes a coil assembly 88 and a magnetic track assembly 90. The controller 20 provides independent motor control signals to a motor drive system 52, schematically illustrated in FIG. 11, which provides the drive signal to the coil assemblies 88 of each motor 37,37. The motor drive system 52 includes a servo controller 92, servo amplifiers 94,94, encoders 54,54, a photodetection device 56 and position switches 58,59.

As best shown in FIG. 9, each carriage 66 includes a pair of generally rectangular plates 96,98 of non-ferromagnetic material, such as aluminum, secured orthogonal together by mechanical fasteners, such as bolts, to form a T-shaped carriage 66 rotated ninety degrees. A pair of downwardly opening orthogonal walls 100,100 provide mounting surfaces for the spinner assembly 64. A pair of upwardly opening orthogonal walls 102, 102 provide surfaces for slidably engaging the orthogonal surfaces 86, 86 of the spar 34 (See FIG. 6).

The orthogonal plates 96,98 of each carriage 66 include a series of interconnected air passageways 104 shown in phantom that terminate at a plurality of orifices 106 arranged in a predetermined pattern on the upper orthogonal walls 102, 102. The passageways 104 further include a common supply orifice 108 exiting from a side wall of the horizontal plate 96. Compressed gas, such as air, is provided to the supply orifice 108 through a tube (not shown) which flows through the passageways 104 of each carriage 66 and exits the orifices 106 to repel the carriage away from the orthogonal surfaces 86, 86 of the spar 34. On the upper orthogonal walls 102,102, the orifices 106 are arranged in two parallel rows equi-spaced apart along the length of the carriages 66.

Each carriage 66 is preloaded or coupled by a plurality of magnetic means 110, such as rare earth permanent magnets or electromagnetic means, secured by an adhesive or mechanical fastener within a plurality of pockets 111 arranged in a predetermined pattern in the upper orthogonal walls 102,102 of the carriages 66. The magnets 110 are mounted preferably recessed from or coplanar with the upper orthogonal walls 102, 102. The magnets 110 mounted in the upper vertical wall 102 are linearly arranged and equi-spaced between the two rows of orifices 106. The magnets 110 mounted in the upper horizontal wall 102 are arranged in two parallel rows collinear and interposed with the parallel rows of orifices 106.

The permanent magnets 110 provide an attractive force opposite to the repulsive force of the compressed air such that the carriages 66 are maintained in a parallel relationship a predetermined small distance from the spar 34. The strength of the magnets 110 is such that their attractive force is balanced to equal the repulsive force of the compressed air and gravity in the vertical direction so that an air gap between the spar 34 and the orthogonal walls 102, 102 of the carriages 66 are approximately 8 microns which provides a preferred degree or value of "stiffness". "Stiffness" is defined as the resistance to lateral movement in the X or Y axis, or angular deflection about the pitch, roll and yaw axis of the carriage 66 relative to the spar 34 when an external force is applied to the carriage.

Referring to FIGS. 6 and 9, the linear motors 37,37 similar to ones manufactured by Trilogy Systems Corp., provide the motive force to independently move each respective carriage 32,33 along the length of the spar 34. The linear motors 37,37 are preferably a d.c. brushless motor comprising a coil assembly 88 and a magnetic track assembly 90. The coil assembly 88 includes a plurality of motor windings or phases (not shown).

Imaging devices in the field of graphic arts require a high degree of precision when scanning the imaging beam onto the media and, therefore, travel of the carriages 32,33 along the spar 34 at a constant velocity is critical. Discontinuity in the movement or variation in velocity of the carriage results in the problem of "banding" or longitudinal lines formed in the media 17.

The motor phases of the linear motors 37,37 are therefore switched or commutated preferably by sinusoidal commutation. Sinusoidal commutation provides near perfect smoothness, meaning the carriages 32,33 travel at a controlled velocity with little or no bounce or discontinuity in the movement of the carriages. The velocity of the carriage is typically low, i.e. 10 microns/2.5 msec or 4 mm/sec. At this rate, each scan line must be uniformly spaced within a small fraction of a scan line (1/100 of a line), or objectionable image signature (banding) results. Therefore, the velocity must be uniform down to levels of less than 1.0% over frequency ranges up to and including 400 Hz.

The motor phases may also be switched using Hall Effect devices that are integral to the coil assemblies 88. The use of Hall Effect devices, however, create a force discontinuity in the linear motors 37,37 resulting in an inconsistent rate of movement of the carriages 32,33, and therefore are preferably used for point to point positioning of the load.

Referring to FIGS. 6 and 9, a coil assembly 88 is mounted to the upper wall 102 of the horizontal plate 96 of each carriage 32,33. Each coil assembly 88,88 engages a common magnetic track assembly 90 which in the preferred embodiment is mounted to the side surface of the spar 34.

As shown in FIGS. 2, 6 and 10, the track assembly 90 is formed of a U-shaped track 114 of ferromagnetic material having a pair of opposing side walls 112 and extends longitudinally along the spar 34. Magnets 116 are secured to the inner side walls 112 of the track 90 so the two rows of magnets face each other. The magnets 116 of each row are secured with opposite and alternating polarity so that the direction of the flux fields 118 alternates with each opposing pair of magnets. The width of the track 114 is sufficiently wide to permit the coil assemblies 88 of the linear motors 37 to freely pass between the rows of magnets 116 secured within the track resulting in frictionless movement of the carriage 66.

In a preferred embodiment of FIG. 6, the spar 34 is formed of granite. The advantage of a granite spar is the orthogonal surfaces 86, 86 can be accurately lapped to very precise tolerances of smoothness and straightness. Furthermore, the granite material is less susceptible to warping or bending as a result of internal stresses and environmental conditions. To magnetically couple the carriages 66 to the granite spar 34, the spar requires a plurality of strips 120 or sections of ferromagnetic material inlaid within the orthogonal surfaces 86, 86 of the spar by an adhesive material. The strips 120 are disposed longitudinally the length of the spar 34 opposite the magnets 110 (see FIG. 9) secured in the carriage walls 102,102. The strips and orthogonal walls of the granite spar are simultaneously lapped to provide flat coplanar surfaces for engaging the carriages 66.

Figure 11:
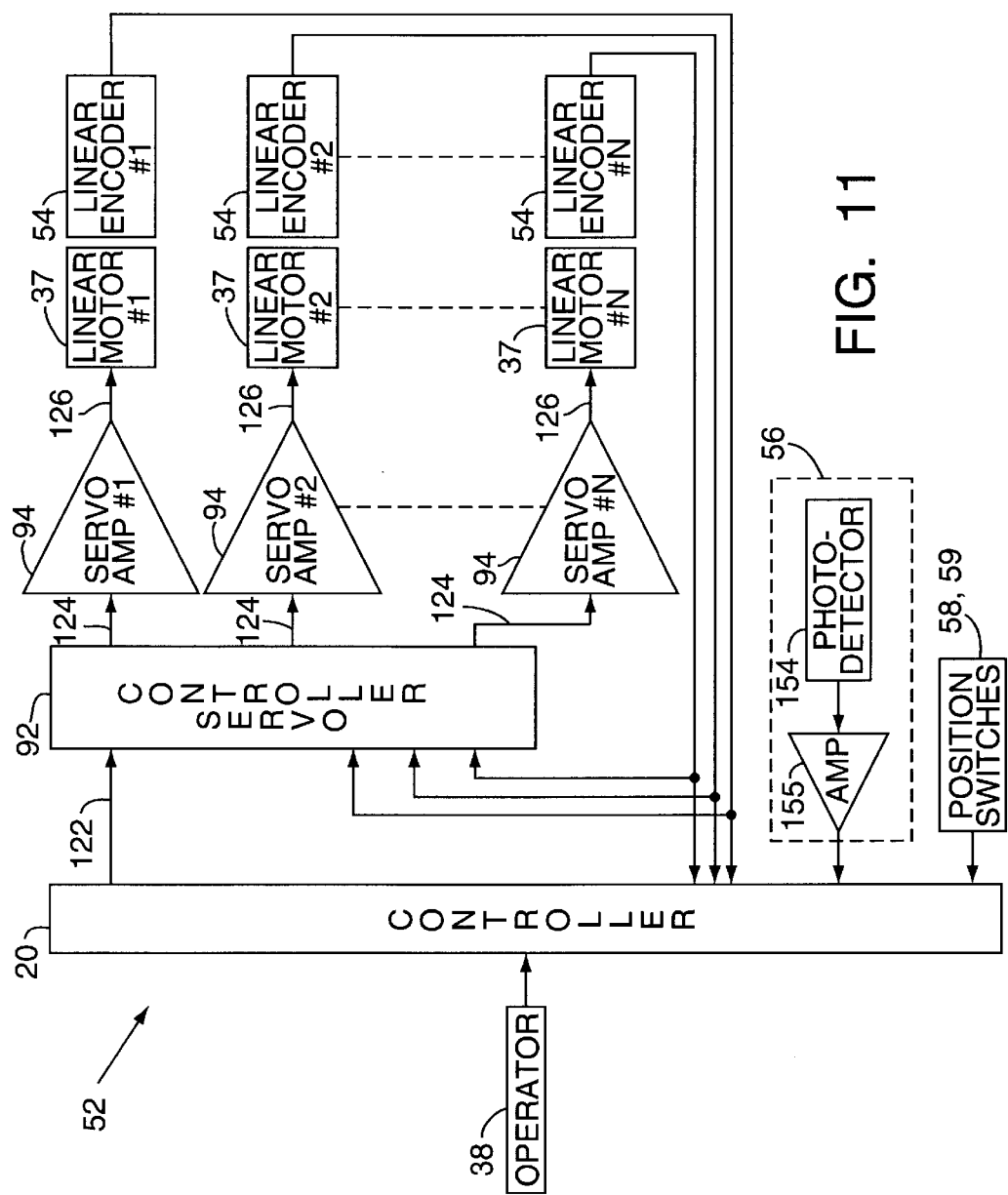
FIG. 11 is a schematic functional diagram of the linear motor drive system for the motion system of the imaging device of FIG. 1.

Schematically shown in FIG. 11, the motor drive system 52 includes a servo controller 92, servo amplifiers 94,94, linear encoders 54,54, a photodetection device 56 and position switches 58,59. The motor drive system 52 provides the drive signals to the windings of each linear motor 37,37. The motor control processor 42,44 of the controller 20 provides output signals over a serial RS232 port 122 to the servo controller 92, such as one manufactured by Delta Tau, in response to input signals provided by the operator 38, linear encoders 54, photodetection device 56 and position switches 58,59.

The servo controller 92 provides servo signals through conductors 124,124 to each servo amplifier 94,94 which then provide sinusoidal drive signals to the coil assemblies 88 of each linear motor 37,37 through conductors 126,126. Each linear encoder 54 provides a signal indicative of the position of the corresponding carriage 66 along the spar 34 to the controller 20 and the servo controller 92 to close the position loop of the servo. The position of the carriages 66,66 are stored in memory of the central processor 40 of the controller 20 which monitors the position of the carriages as they travel along the spar 34.

Based upon the input from the operator 38 and the position of the carriages 66, the motor control processors 42,44 independently provide the motor control signals to the servo controller to drive the motors 37 and move the carriages from a starting point to an end point along the spar 34 at a controlled velocity in response to carriage control signals provided by the central processor 40. The central processor of the controller 20 also monitors the position of each of the scanning assemblies along the spar, and provides buffer zones and safety stop signals to prevent the carriages from colliding into each other, as described hereinbefore. The central processor 40 of the controller 20 functions to provide an image scan enabling/disabling signal to initiate and end the scanning of the optical beams 28,30 from the beam generators 21,22 onto the media 17.

Referring to FIG. 6, the linear encoders 54,54 include a common linear scale 128 and an encoder head 130 mounted onto each carriage 66,66. The scale 128 is mounted longitudinally to the track assembly 90 and the encoder heads 130 are mounted to the edge of the horizontal plate 96 of the carriages 66,66. In the preferred embodiment, the resolution of the encoder is 0.25 micron.

Referring to FIGS. 13 and 14, the internal drum 12 includes a pair of docking sensors 131, such as a strain gauge, a precision switch and a Hall effect device, that provide to the controller 20 or operator 38 a docking signal that is representative of the position of the media plate 17 on the interior surface 16 of the internal drum. The sensors 131 are spaced laterally on the forward edge 134 of the internal drum and extend radially over the forward edge 134 to engage the leading edge 136 of the media plate 17. The leading edge 136 of the media plate 17 is preferably oriented parallel to the central axis z of the internal drum 12 at a predetermined distance from the forward edge 134 of the drum 12.

Figure 15:
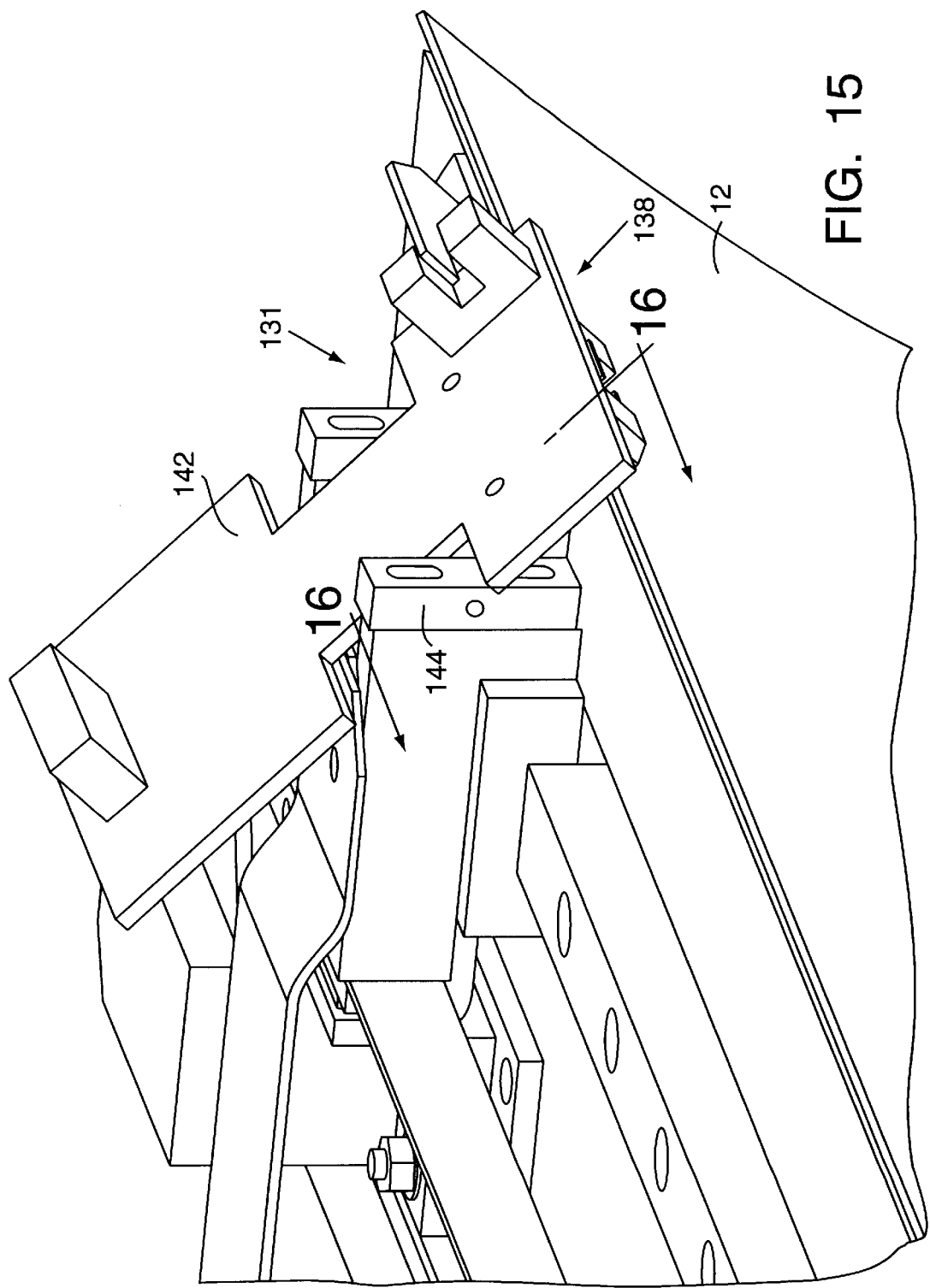
FIG. 15 is an expanded, perspective view of the docking sensor of FIG. 14.
Figure 16:
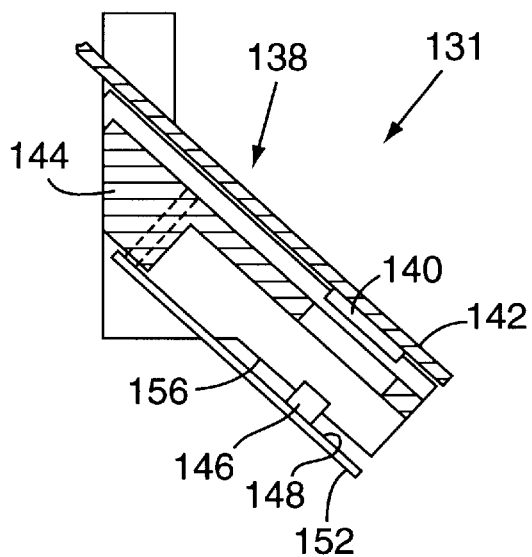
FIG. 16 is a cross sectional view of the docking sensor of FIG. 15 taken along the lines of 16—16.

FIGS. 14–16 illustrate a preferred embodiment of the docking sensors 13 similar to that disclosed in Applicants' co-pending U.S. patent application Ser. No. 08/844,668, entitled "Media Feed Apparatus For An Imaging Device" (Attorney Docket No. I48–1121), which is incorporated herein by reference. The docking sensors 131 include a Hall Effect device 138 having a Hall Effect transducer 140 and an electrical comparator circuit 142 mounted to a circuit board. The Hall Effect device 138 is mounted to an upper surface of a non-magnetic frame 144. The docking sensors 131 further include a magnet 146 mounted on the top surface 148 of: the outer end of a leaf spring 152. The inner end of the leaf spring is secured to the frame 144 so that the leaf spring extends below the bottom surface 156 of the frame to enable the leading edge 136 of the media plate 17 to contact and flex the leaf spring. The magnet 146 is arranged on the leaf spring 152 to align with the Hall Effect transducer 140. The leaf spring is preferably formed of non-magnetic material, such as beryllium copper alloy (No. 172), having high fatigue life, temperature stability and non-deformity.

The Hall Effect device 138 senses the change in the electromagnetic field generated by the magnet 146 as the magnet moves closer thereto. When the leaf spring 152 is contacted by the leading edge 136 of the media plate 17, the leaf spring deflects towards the Hall Effect device which provides a linear output voltage proportional to the electromagnetic field change. The linear output is compared to z trip signal provided by the controller 20 which is representative of the desired position of the media plate 17. When the output of Hall Effect transducer 140 is greater than the trip signal, the comparator circuit 142 generates a docking signal indicative that the portion of the media plate contacting the docking sensor 131 is disposed at a desired location on the internal drum 12. When the linear outputs of both Hall Effect transducers are just greater than the trip signals, the controller 20 recognizes the media plate is disposed at the desired position and orientation.

Figure 17:
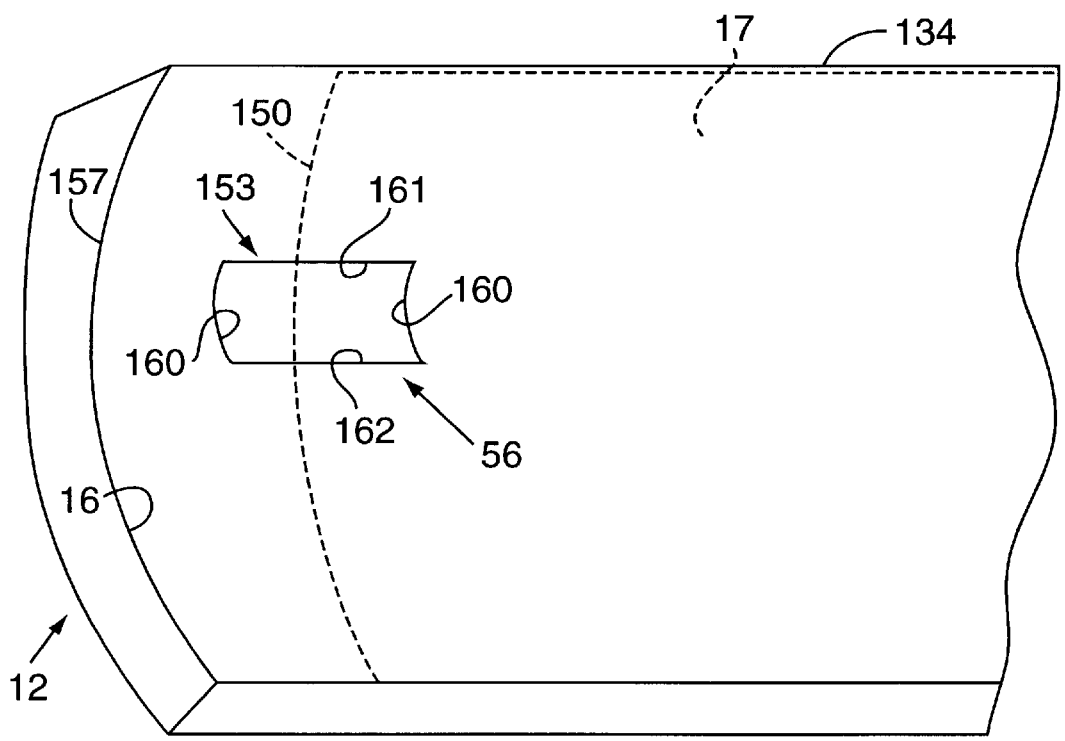
FIG. 17 is an expanded, perspective view of a photodetection device and the internal drum shown partially broken away.

In the preferred embodiment shown in FIGS. 13 and 17, the photodetection device 56 is embedded below a mask or window 153 in the interior surface 16 of the internal drum 12. The photodetection device includes a photodetector 154 such as a photodiode, and an electrical circuit 155 that amplifies the signal generated by the photodetector in response to detection of the optical beams 28,30. The photodetection device provides the amplified signal to the controller 20 in response to detection of the optical beams 28,30 reflected from the scanning assemblies 32,33. The controller 20 receives the amplified signal of the photodetection device and uses this feedback to locate the side edge 150 of the media plate, to calibrate the location of the optical beams 28,30 reflected to the media plate in the fast scan and slow scan directions, and to calibrate the light intensity of the optical beams. The photodetector must be sufficiently fast to detect a single pixel illuminated by the optical beam (i.e. 20 nanoseconds rise time) to calibrate the location of the optical beam, especially in the fast scan direction.

The mask 153 is disposed at a predetermined location from an outer edge 157 of the internal drum 12 so that a media plate 17 secured to the interior surface 16 overlaps a portion of the mask. The mask must also be located on the internal drum to enable the optical beams 28,30 reflected by all of the scanning assemblies 32,33 to pass thereover. Referring to FIG. 18, some imaging devices 10, especially those having a great number of scanning assemblies and/or a limited extension of the spar 34 beyond the outer edge 157 of the internal drum 12, may require a pair of photodetection devices 158,159. The first detector 158 is disposed or the internal drum for locating the side edge 157 of the media plates 17, as described above. The second photodetection device 159 is disposed at a position on the internal drum whereby all the optical beams 28,30 of the scanning assemblies 32,33 may pass over for calibrating the location and light intensity of the optical beams.

It is important that the edges of the mask 153 are accurately disposed at known locations and orientations on the internal drum 12 for providing feedback to the controller 20 for calibrating the location of the optical beams 28,30 on the internal drum relative to the location of the scanning assemblies 32,33 on the spar 34 and rotational position of the spinner mirrors 68,68. Generally, the side edges 16, of the mask 153 are disposed perpendicular to the longitudinal axis z of the internal drum 12; and the upper and lower edges 161,162 are disposed parallel to the longitudinal axis. z As described above, one function of the photodetection device 56 is to determine the location of the side edge 150 of the media plate 17 disposed on the interior surface 16 of the internal drum 12 by sensing the presence of the reflected optical beam 28 from a scanning assembly 32 as the beam moves along the axis z of the internal drum.

Figure 19:
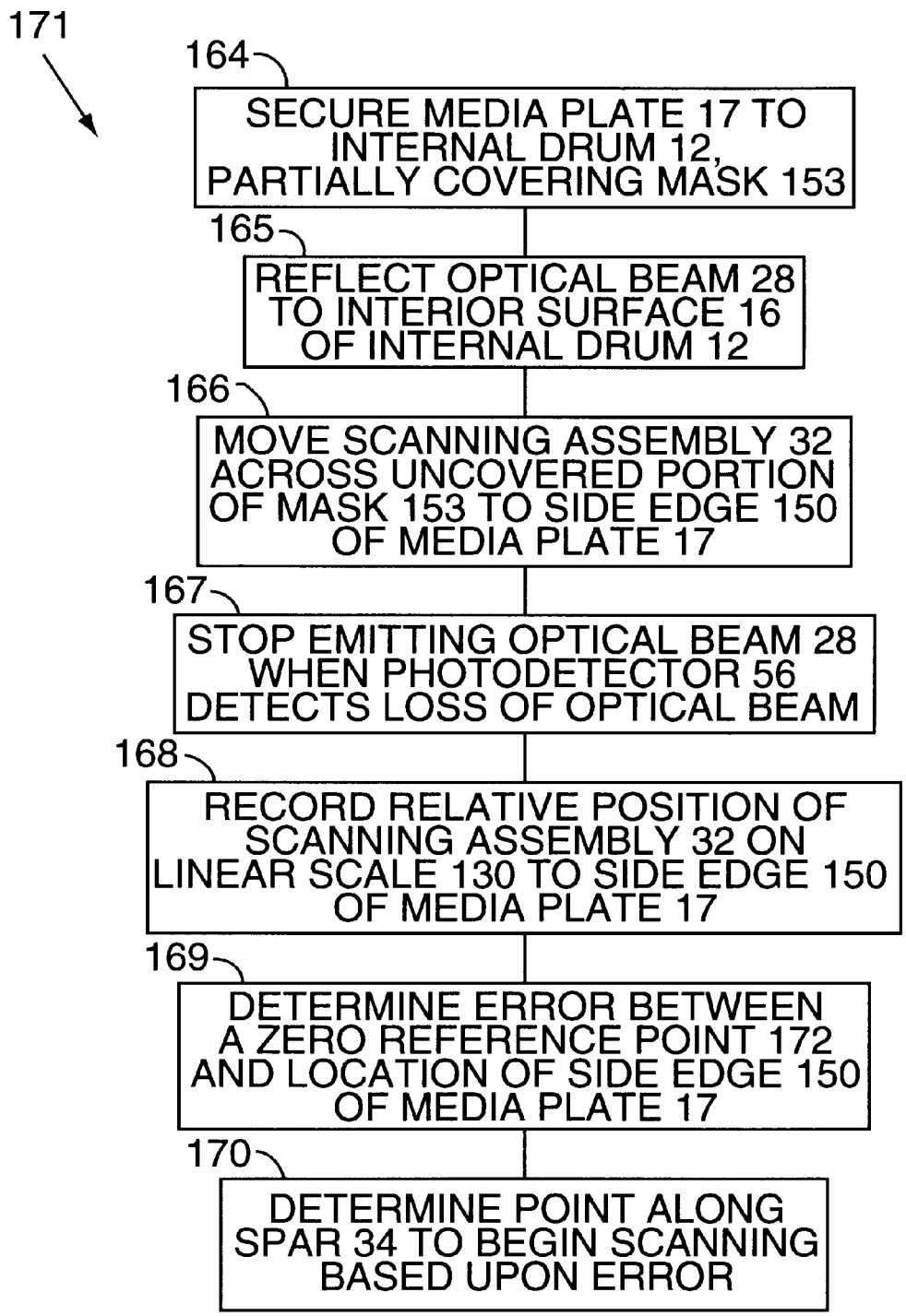
FIG. 19 is a functional diagram of a preferred sequence of operations of the imaging device of FIG. 17 to detect the side edge of a media plate.

The functional block diagrams 164–170 of FIG. 19 illustrates a method 171 of detecting the side edge 150 of the media plate 17. The media plate is first secured to the internal drum 12 by the vacuum such that the side edge 150 is disposed over a portion of the mask 153 for the photodetection device 56. The controller 20 then commands a scanning assembly 32 to reflect an optical beam 28 to the interior surface 16 of the internal drum 12 as the scanning assembly moves from the end of the internal drum, closest to the photodetection device, to the side edge 150 of the media plate. As the optical beam passes over the uncovered portion of the mask 153, the photodetection device provides a signal indicative of the presence of light. As the optical beam 28 contacts the media plate, the photodetection device 56 provides a signal indicative of the loss of light. The controller, in response to the loss of light, commands the optical beam generator 21 to stop emitting an optical beam 28 to prevent further exposure of the media plate 17, and records the position of the scanning assembly 32 along the linear scale 128 of the encoder 54. The controller 20 then compares the recorded position with a predetermined zero reference point 172 on the internal drum to define an error. The controller then changes the starting point to begin scanning the media plate to compensate for he error.

Figure 20:
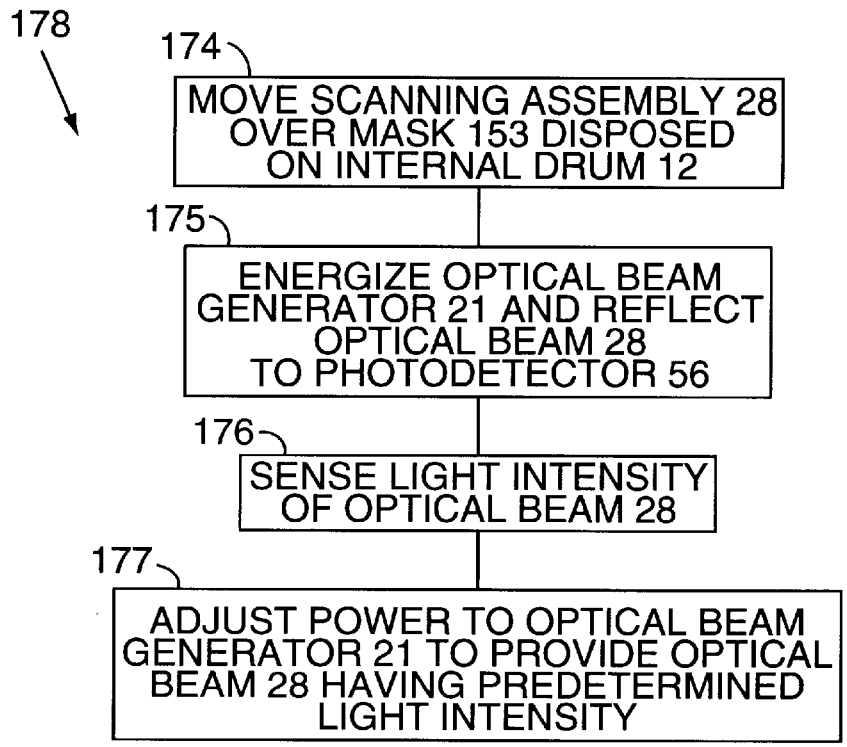
FIG. 20 is a functional diagram of a preferred sequence of operations of the imaging device of FIG. 17 to calibrate the light intensity of the optical beam.

The functional block diagrams 174–177 of FIG. 20 illustrates a method 178 of calibrating and normalizing the light intensity of the optical beams 28,30 emitted by each beam generator 21,22. The controller 20 provides motor drive signals to move a scanning assembly 32 to a position above the mask 153 of the photodetection device 56 and energizes the optical beam generator which is reflected to the photodetection device by the spinner mirror 68. The photodetection device senses the optical beam and provides a signal proportional to the light intensity of the optical beam to the controller 20. The controller then adjusts the power of the optical beam 28 emitted from the respective beam generator 21 to a desired level. These steps are then repeated for each of other beam generators 22 to normalize all of the optical beams to have uniform light intensity. One skilled in the art would recognize that the capability of independently adjusting the power of the beam generators 21,22 enables the imaging beams 28,30 to be adjust to different light intensities depending upon the application.

Figure 21:
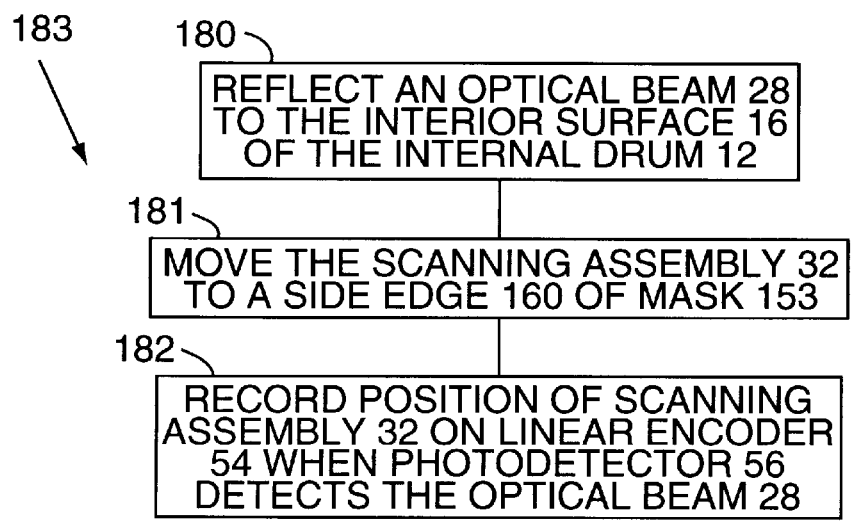
FIGS. 21 is a functional diagram of a preferred sequence of operations of the imaging device of FIG. 17 to calibrate the location of an optical beam on the surface of the drum in the fast scan direction.

The functional block diagrams 180–182 of FIG. 21 illustrates a method 183 of locating the relative position of each optical beam 28,30 in the fast scan direction, along the longitudinal axis z of the internal drum 12. In other words, the method correlates a known location of the optical beam 28 on the drum to a point on the linear scale 128 of the encoder 54. The controller 20 first commands a scanning assembly 32 to reflect an optical beam 28 to the interior surface 16 of the internal drum as the scanning assembly moves from the outer edge 157 of the internal drum closest to the photodetection 56 to the side edge 160 of the mask 153. When the optical beam 28 reaches the side edge of the mask, the photodetection device provides a signal indicative of the presence of light. The controller 20, in response to the detection of the optical beam 28, then records the location of the scanning assembly 32 on the linear scale 128 of the encoder 54. These steps are then repeated for each of the other scanning assemblies 33. Location of the relative position of the optical beam 28 in the fast scan direction permits the controller 28 to accurately locate the optical beam at the desired location on the media plate 17 based upon the feedback provided by the linear encoder 54.

Figure 22:
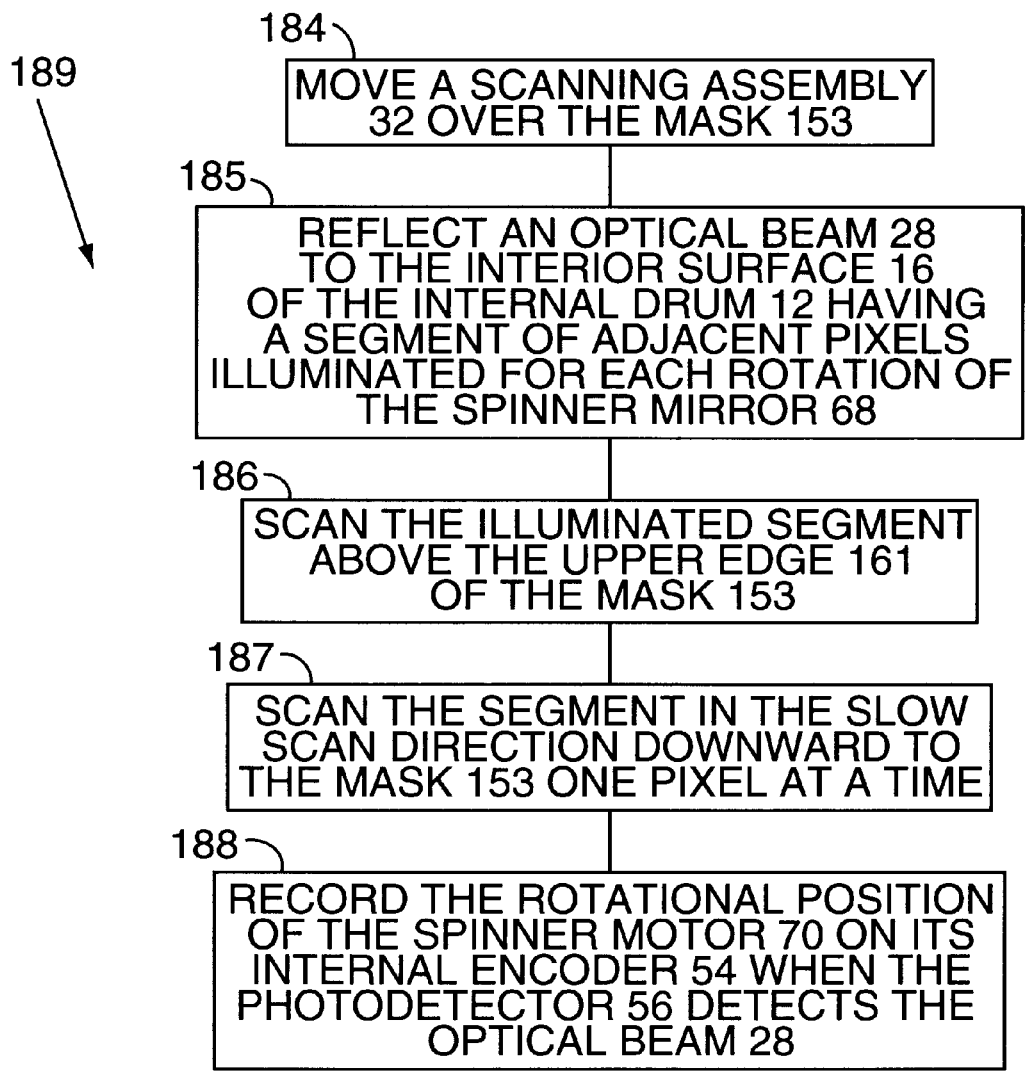
FIGS. 22 is a functional diagram of a preferred sequence of operations of the imaging device of FIG. 17 to calibrate the location of an optical beam on the surface of the drum in the slow scan direction.

The functional block diagrams 184–188 of FIG. 22 illustrates a method 189 of locating the relative position of each optical beam 28,30 in the slow scan direction, perpendicular to the central axis z of the internal drum 12. In other words, the method correlates a known location of the optical beam 28 on the internal drum 12 with the rotational position of the spinner mirror 68. The controller 20 first provides motor drive signals to move a scanning assembly 32 to a position over the mask 153 of the photodetection 56 and energizes the optical beam generator 21 to illuminate a segment of predetermined number of consecutive pixels, preferably four pixels, onto the interior surface 16 above the upper edge 161 of the mask 153. The controller commands the beam generator 21 to scan the illuminated segment toward the upper edge of the mask of the photodetection device 56 one pixel at a time. When the leading pixel of the segment extends beyond the upper edge 161 of the mask 153, the pixel illuminates the photodetection device which then provides a corresponding signal to the controller 20. The controller then records the rotational position of the mirror 68 provided by the internal encoder of the spinner motor 70 relative to the known position on the interior surface 16 of the drum 12. These steps are then repeated for each of the other scanning assemblies 33. Location of the relative position of the optical beam 28 in the slow scan direction permits the controller 20 to accurately locate the optical beam at the desired location on the media plate 17 based upon the feedback provide by the encoder of the spinner motor 70.

Referring to FIG. 23, the position indicators 58, 59 for the home positions and park positions, respectively, for the scanning assemblies 32,33 may be defined electronically along the linear scale 128 of the encoder 54. The controller 20 may be programmed to recognize a predetermined point along the scale 128 as the home or park position for a particular scanning assembly. For example, when the encoder head 130 of a particular scanning assembly reaches a particular position along the linear scale 128, the controller 20 will recognize that the carriage 66 is located at the home or park position and command the linear motors to stop 37,37 to stop or take appropriate action.

The home position for the rearward assembly 33 is located at a point between the side edge 150 of the media 17 and the location where scanning of the image begins. The home position for the forward assembly 32 is at a page break or alley between the images to be scanned on the media. The park position indicators 59,59 are located at the ends of the spar 34 that extend outside of the internal drum 12 to prevent any interference when the media plate 17 is being loaded onto and off of the drum.

In an alternative embodiment shown in FIGS. 6 and 23, the home position indicators 58,58 and parking position indicators 59,59 include a sensing element 192 and a plate 194. The sensing elements 192,192 are mounted along the spar 34 according to the home and parking positions of the scanning assemblies 32,33.

The sensing elements 192, 192 includes two members 196, 196 that extend outwardly from the spar. One member 196 includes an LED 198 and the second member includes a photosensitive element 121 for receiving the light emitted from the LED. The sensing element 192 provides a signal to the controller 20 representative of whether the photosensitive element 121 is receiving light from the LED 198 or not. The plate 194 is mounted to the carriage 66 for passing between the members 196, 196 of the sensing element 192. When the carriage 66 is moved to the home position, the plate blocks the light emitted from the LED 198 resulting in an open signal provided by the sensing element to the controller 20 indicating that the carriage 66 is at the home position.

Figure 24A:
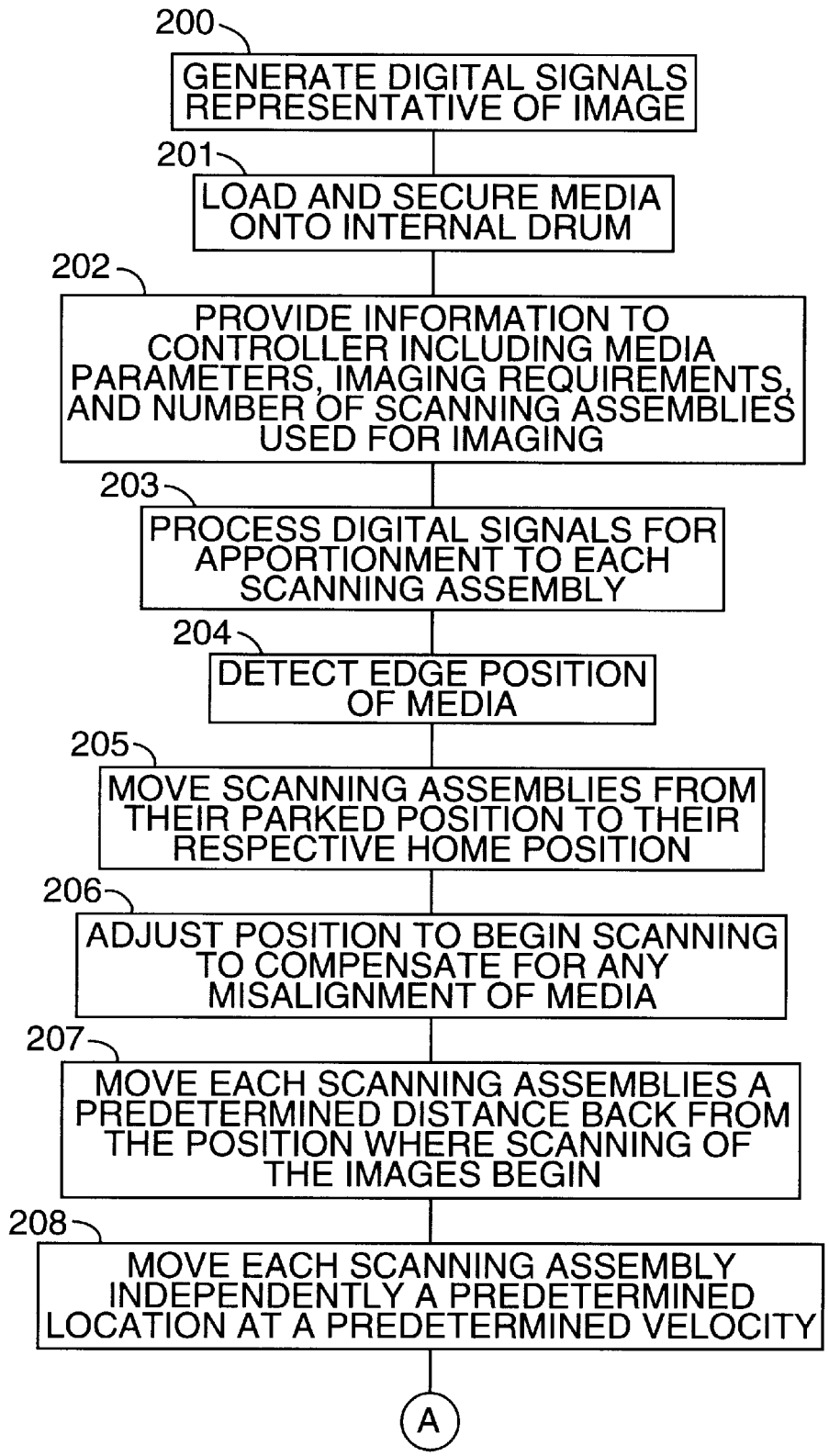
FIG. 24(a) and 24(b) are a functional diagram of a preferred sequence of operation of the imaging system of FIG. 1.
Figure 24B:
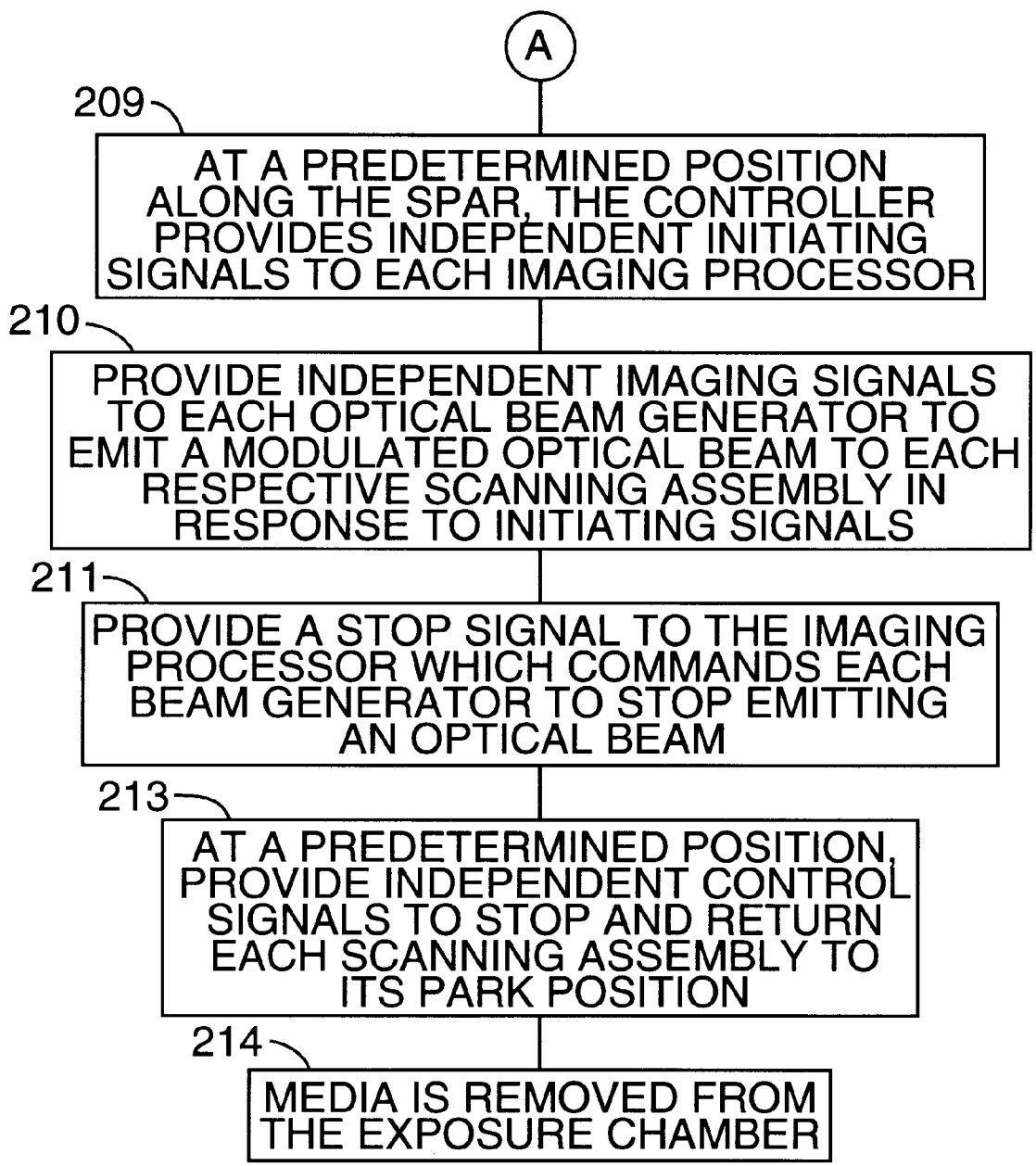

FIGS. 24(a) and 24(b) illustrate a functional block diagram of FIGS. 24(a) and 24(b) of an algorithm for a method of scanning a media plate using a multiple beam scanning system. The Raster Image Processor (RIP) 31 (see block 200) generates digital signals representative of the image to be scanned onto the media 17.

In block 201, the media 17 is then loaded upon the internal drum 12 and the controller 20 commands the vacuum generator 18 to apply vacuum pressure to draw and secure the media to the drum surface 16.

The operator provides to the controller 20 information such as media parameters, imaging requirements, and the number of scanning assemblies used for imaging, as shown in block 202. The media parameters include the dimensions of the media and type of media. The imaging requirements include the dimensions and locations of the individual pages or images to be scanned on the media.

Referring to block 203, the central processor 40 of the controller 20 stores and processes the digital raster data received from the RIP 31. The processed digital data is then apportioned and provided by the central processor to each imaging processor 46,48. The raster data may be generated by a single RIP 31 (see FIG. 3) wherein the central processor 40 processes the digital data for routing a portion of the data to each of the respective optical beam generators 21, 22. In the alternative as shown in FIG. 4, the raster data may be generated by a plurality of RIPS 60,62 whereby the data from any RIP or group of RIPS is assigned and routed by the controller 20 to each respective imaging processor.

The photodetection device 56 (see block 204) then provides a position error signal to the central processor of the controller 20 which is representative of the difference between the zero reference position 176 and the actual position of the side edge 150 of the media 17.

In block 205, the central processor 40 independently provides control signals to the respective motor control processor 42,44. In response to the control signals, the respective motor control processors of the controller 20 independently provide a signal to each motor control circuit 52 which drives the linear motors 37, 37 of the scanning assemblies 32, 33 to move each carriage 66 along the spar 34 to their respective home positions. When the carriages 66 reach their home positions, their respective home positioning switches 58,58 provide a signal to the controller 20 to de-energize the motor control circuits 52, 52 to stop the carriages.

The home positions for the forward and rearward scanning assemblies 32,33 are positioned a predetermined distance from the side edge 156 of the media plate 17. The home positions for the forward scanning assembly is adjacent to the edge of the media and for the rearward scanning assembly is positioned at a page break or alley 129 between a pair of columns of images 130 scanned on the media.

In block 206, the central processor 40 of the controller 20 is programmed to initiate the imaging of the media 17 at a predetermined distance from the home position switches 58,58 for the forward and rearward scanning assemblies 32, 33. The controller 20 adjusts the predetermined distance based upon the position error signal to compensate for any misalignment of the media on the internal drum 12.

The controller 20 commands the linear motor 37 to move the carriages 66 to approximately 5 mm back from the position where scanning is to begin (see block 207). This predetermined distance permits the carriages to accelerate to a desired constant velocity before reaching the position to begin scanning.

In block 208, when it is desired to begin the imaging process, the controller 20 energizes the linear motor 37 to move the carriage a distance equal to the image length plus a deceleration distance. Preferably, the scanning assemblies travel in the same direction to minimize the chances of collision, however, the scanning assemblies may travel in opposition directions provided the assemblies are not commanded to the same location at the same point in time.

When the controller 20 determines that the carriage has reached the imaging position on the media 17 (see block 209), the controller provides an initiating signal to begin the laser scanning of the image onto the media. In block 210, the beam generators 21,22 emits modulated optical beams 28,30 representative of the stored digital signals by the central processor 40.

Referring to blocks 211–213, after the carriages 66 have traveled the commanded distance along the spar 34, the controller 20 provides a signal to stop the laser scanning. The controller 20 then commands the carriages 66 to stop or slew back to their respective park positions located at a position along the spar 34 outside of the exposure chamber 14. The controller commands the vacuum generator 18 to remove the vacuum pressure to enable the media 17 to be removed from the internal drum 12.

For special cases when the entire media plate 17 consists of a single contiguous image having no alleys or page breaks 129, the image may be scanned using a single scanning assembly 21. Before scanning with a single scanning assembly, the other scanning assemblies 22 are parked outside of the exposure chamber 14. The image is then scanned as previously described. The single continuous image also may be scanned utilizing multiple scanning assemblies 32, 33 however, the image will include stitching error as a result of the portions of the image scanned not aligning perfectly.

Figure 25:
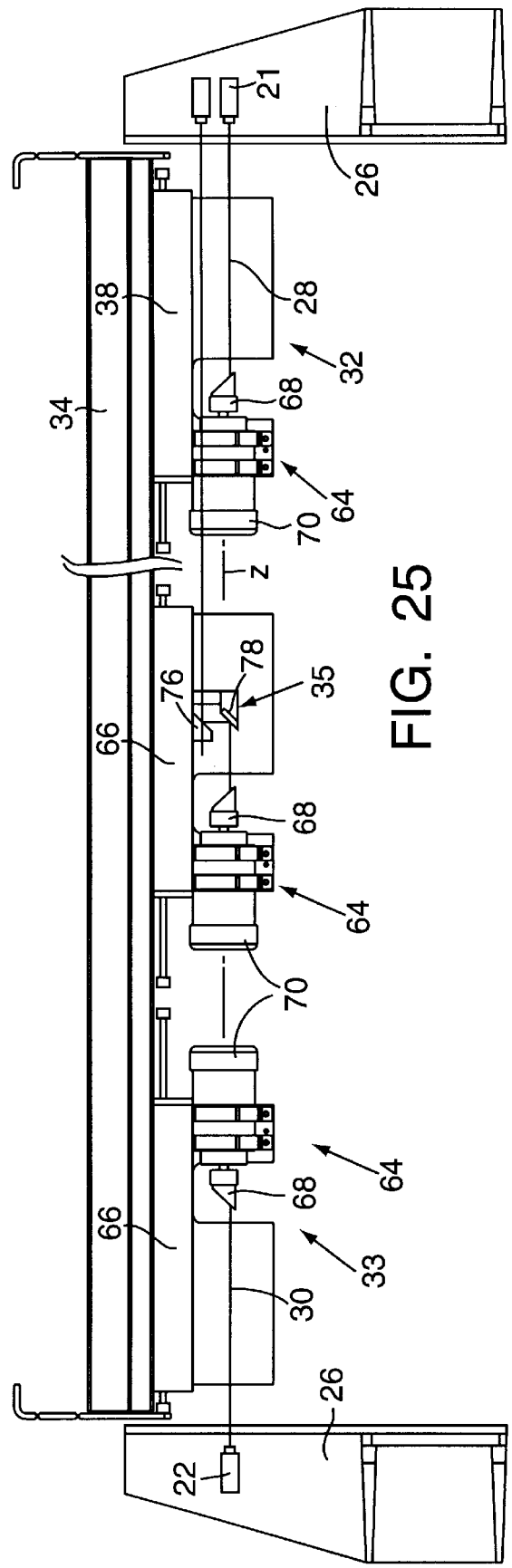
FIG. 25 is an expanded, side elevational view of a third alternative embodiment of scanning assemblies, beam generators and spar of the scanning system provided in accordance with the present invention.

A preferred embodiment described hereinabove includes a forward and rearward scanning assemblies and two corresponding beam generators, however, one would recognize that an $n^{th}$ number of scanning assemblies and beam generators may be used to scan the media as shown in FIGS. 3 and 4. An alternative embodiment shown in FIG. 25 illustrates an imaging system similar to the embodiment shown in FIG. 12 with a third intermediate scanning assembly disposed between the forward and rearward assemblies. The intermediate assembly includes an optical periscope as shown in FIG. 2.

The above-described method for scanning the media 17 using an $n^{th}$ number of scanning assemblies is the same as that described for imaging with two scanning assemblies irrespective of the number of scanning assemblies 32,33 disposed on the spar 34, the location of the beam generators 21,22, or the direction of the movement of the carriages 66.

The preferred embodiment of the multiple beam scanning system is described for the use in a photoplotter 10, however one skilled in the art would recognize that they may also be used in a scanner imaging system wherein an optics beam is emitted or reflected from the media to a mirror which directs the optical beam to an optical beam receiver for generating imaging signals representative of the image disposed on the media.

One skilled in the art would also recognize that the multiple beam scanning system 10 may be used for any imaging system such as those systems comprising a flat imaging bed or an external imaging drum.

Furthermore, the beam forming optics 23,24 may be disposed on each carriage 66,66 of the scanning assemblies 32,33 as disclosed in copending U.S. patent application Ser. No. 08/674,439, entitled "Apparatus And Method For Positioning A Lens To Expand An Optical Beam Of An Imaging System" (Attorney Docket No. I48–1095), which is incorporated herein by reference.

The capability of simultaneously and independently scanning a plurality of images to a plate of media provides a number of advantages. The use of multiple scanning assemblies 32, 33 reduces the time for scanning each plate by a factor of the number of scanning assemblies coupled to the spar which greatly increases the production rate of the media.

The multiple independently controlled scanning assemblies also provide a number of operating modes to scan the media. For instance, all but one of the scanning assemblies may be parked away from the exposure chamber and a single scanning assembly may be use to scan a single continuous image on the media. Furthermore, the images scanned by each scanning assembly 32,33 may be scanned at independent spot sizes, wavelengths, and resolutions in both the fast scan and slow scan directions. A plurality of plates disposed on the internal drum may also be scanned simultaneously by assigning at least one scanning system to each plate of media.

Independently controlled scanning assemblies 32, 33 also eliminate the requirement to rotate the parabolic mirror 68 at the same time in the same direction and the requirement for the angle of the parabolic mirror be phased commonly with a master spinner or a master clock signal.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A controller for an imaging device for scanning media including a scanning surface; a rigid spar extending the length of the scanning surface and parallel to a central longitudinal axis of the scanning surface; a plurality of scanning assemblies for reflecting respective optical beams to media releasably secured to the scanning surface, the scanning assemblies movably coupled to guide surfaces of the spar; a plurality of beam generators for emitting modulated optical beams to expose the media; and a plurality of corresponding motor drive systems for energizing a corresponding motor to move each respective scanning assembly along the spar, said cotroller comprising:

(a) means for receiving a position error signal representative of the difference between a zero reference position and the actual position of an edge of the media disposed on the scanning surface;

(b) means for receiving position signals representative of the location of a respective scanning assembly along the spar;

(c) means for generating first drive signals provided to each respective motor drive system for moving independently each scanning assembly to a respective predetermined home position on the spar in response to an initialization signal and the position signals;

(d) means for generating second drive signals provided to each respective motor drive system for moving independently each scanning assembly at a predetermine velocity a predetermined distance along the spar in response to an initiate scanning signal;

(e) means for providing a plurality of digital signals representative of an image to be scanned to the media, in response to said position signals and position error signal, to each respective optical beam generator, whereby each optical beam generator emits a modulated optical beam to a respective scanning assembly for reflecting the optical beam to the media as the scanning assemblies travel the predetermined distance along the spar at a predetermined location on the media.

2. The controller, as set forth in claim 1, wherein said means for generating drive signals moves each scanning assembly to a predetermined distance back from the point of imaging the media to permit the velocity of the scanning assemblies to accelerate to the predetermined velocity.

3. The controller, as set forth in claim 1, further includes a means for monitoring the position, velocity and direction of movement of each scanning assembly and provide a signal to the motor control system for avoiding collisions of the scanning assemblies.

4. The controller, as set forth in claim 1, further includes:

means for receiving a first calibration signal representative of the location of an optical beam on the scanning surface relative to the position of a scanning assembly along the spar in a fast scan direction;

means for defining a location to initiate scanning of the image on the scanning surface in response to a first calibration signal;

means for receiving a second calibration signal representative of the location of an optical beam on the scanning surface relative to the rotational position of a mirror of a scanning assembly in a slow scan direction; and means for defining a location to initiate scanning of the image on the scanning surface in response to a second calibration signal.

5. The controller, as set forth in claim 1, further includes:

means for receiving a calibration signal representative of the light intensity of an optical beam; and means for adjusting the beam generator to emit a beam of predetermined light intensity in response to the calibration signal.

6. A controller for an imaging device for scanning media including a scanning surface; a rigid spar extending the length of the scanning surface and parallel to a central longitudinal axis of the scanning surface; a plurality of beam receivers for generating imaging signals representative of the image disposed on the media; a plurality of scanning assemblies for reflecting respective optical beams from the media to a respective beam receiver, the scanning assemblies movably coupled to guide surfaces of the spar; and a plurality of corresponding motor drive systems for energizing a corresponding motor to move each respective scanning assembly along the spar, said controller comprising:

(a) means for receiving a position error signal representative of the difference between a zero reference position and the actual position of an edge of the media disposed on the scanning surface;

(b) means for receiving position signals representative of the location of a respective scanning assembly along the spar;

(c) means for generating drive signals provided to each respective motor drive system for moving independently each scanning assembly to a respective predetermined home position on the spar in response to an initialization signal and the position signals;

(d) means for generating drive signals provided to each respective motor drive system for moving independently each scanning assembly at a predetermine velocity a predetermined distance along the spar in response to an initiate scanning signal;

(e) means for receiving a plurality of digital signals representative of the image disposed on the media provided by each respective optical beam receiver, whereby each respective scanning assembly reflects each optical beam from the media to each respective optical beam receiver as the scanning assemblies travel the predetermined distance along the spar at a predetermined location on the media.

7. The controller, as set forth in claim 6, wherein said means for generating drive signals moves each scanning assembly to a predetermined distance back from the point of imaging the media to permit the velocity of the scanning assemblies to accelerate to the predetermined velocity.

8. The controller, as set forth in claim 6, further includes a means for monitoring the position, velocity and direction of movement of each scanning assembly and provide a signal to the motor control system for avoiding collisions of the scanning assemblies.

9. A scanning assembly for an imaging device for turning an optical beam between a beam processor and a scanning surface, the beam processor disposed off of a central longitudinal axis of the scanning surface, the imaging device including a rigid spar extending the length of the scanning surface and parallel to the longitudinal axis of the scanning surface, the spar having a pair of guide surfaces; and a controller for generating drive signals to move the scanning assembly along the spar at a preferred rate; said scanning assembly comprising:

a carriage having a pair of engagement surfaces movably coupled to the pair of guide surfaces of the spar;

a scanning means secured to said carriage disposed axially to the longitudinal axis of the scanning surface; and an optical periscope mounted to said carriage for reflecting the optical beam between the optical beam processor and the scanning means;

said scanning means reflecting the optical beam between said optical periscope and the scanning surface.

10. A scanning assembly for an imaging device, as set forth in claim 9, wherein the optical periscope reflects an optical beam emitted by an optical beam generator to said scanning means; and said scanning means reflects the optical beam to media disposed on the scanning surface.

11. A scanning assembly for an imaging device, as set forth in claim 9, wherein the scanning means reflects the optical beam reflected from media disposed on the scanning surface to said optical periscope, and said optical periscope reflects the optical beam from the scanning means off of the central axis of the scanning surface to an optical beam receiver.

12. A scanning assembly for an imaging device, as set forth in claim 9, wherein the optical periscope comprises an optical fiber having one end mounted axially to the central axis of the scanning surface and the other end mounted off of the central longitudinal axis.

13. A scanning assembly for an imaging device, as set forth in claim 9, wherein the optical periscope comprises a pair of radially-spaced mirrors, said mirrors mounted for reflecting the optical beam from one mirror to a second mirror.

14. A scanning assembly for an imaging device, as set forth in claim 9, wherein the carriage includes a pair of engagement surfaces coupled a predetermined distance from the spar guide surfaces, said carriage including a plurality of magnetic means secured in a pattern to the engagement surfaces of the carriage, said carriage further including a passageway terminating at a plurality of output orifices arranged in a pattern on the engagement surfaces of said carriage and an input orifice for supplying compressed air to said passageway.

15. A scanning assembly for an imaging device, as set forth in claim 9, further comprises a scanning means including a spinner motor having a shaft, and a mirror secured to said shaft for reflecting the optical beam between the optical periscope and scanning surface.

16. A scanning system for an imaging device including a scanning surface for securing the media thereto; and a rigid spar extending the length of the scanning surface and parallel to a central longitudinal axis of said scanning surface, the spar having a pair of guide surfaces; said scanning system comprising:

a plurality of beam processors for each of a plurality of optical beams;

a plurality of scanning assemblies for reflecting respective optical beams between each beam processor and the media, said scanning assemblies movably coupled to the guide surfaces of the spar; and a controller for generating independent drive signals to move each of the scanning means along the spar at a preferred rate, and for processing each of said optical beams.

17. A scanning system, as set forth in claim 16, wherein each beam processors is a beam generator for providing a modulated optical beam in response to signals provided by said controller, and said scanning assemblies reflecting a respective optical beam to the media, said signals representative of digital data representative of a image to be scanned onto the media.

18. A scanning system, as set forth in claim 17, further includes a photodetection device disposed within the scanning surface for providing calibration signals representative of the location of an optical beam on the scanning surface relative to the position of a scanning assembly along the spar in a fast scan direction and representative of the location of an optical beam on the scanning surface relative to the rotational position of a mirror of a scanning assembly in a slow scan direction.

19. A scanning assembly, as set forth in claim 17, further includes a photodetection device disposed within the scanning surface for providing a calibration signal representative of the light intensity of an optical beam.

20. A scanning system, as set forth in claim 16, wherein each beam processors is a beam receiver for providing imaging signals representative of an imaged disposed on the media; said scanning assemblies reflecting a plurality of optical beams to said optical beam receivers; and said controller generating digital signals representative of the imaging signals provided by said optical beam receivers.

21. A scanning system, as set forth in claim 16, wherein the optical beam processors include a pair of optical beam processors, each disposed at opposing ends of the scanning surface oriented to process an optical beam disposed along the central axis of the scanning surface; and said scanning assemblies including a pair of scanning assemblies, each arranged to reflect the respective optical beam between the respective optical beam processor and scanning surface.

22. A scanning system, as set forth in claim 16, wherein a pair of optical beam processors are disposed at one end of the scanning surface; one optical beam processor processing an off-axis optical beam disposed off the central longitudinal axis of the scanning surface; and one of said scanning assemblies including an optical periscope for reflecting said off-axis optical beam.

23. A scanning system, as set forth in claim 22, wherein the optical periscope comprises an optical fiber having one end mounted axially to the central axis of the scanning surface and the other end mounted off of the central longitudinal axis.

24. A scanning system, as set forth in claim 22, wherein the optical periscope comprises a pair of radially-spaced mirrors, said mirrors mounted for reflecting the optical beam from one mirror to a second mirror.

25. A scanning system, as set forth in claim 16, wherein each scanning assembly further comprises:
 a carriage having a pair of engagement surfaces coupled a predetermined distance from said spar guide surfaces, said carriage including a plurality of magnetic means secured in a pattern to the engagement surfaces of the carriage, said carriage further including a passageway terminating at a plurality of output orifices arranged in a pattern on the engagement surfaces of said carriage and an input orifice for supplying compressed air to said passageway;
 a scanning means secured to said carriage for reflecting the optical beam between said respective beam generator and the scanning surface; and
 a linear motor means for moving said carriage along said spar in response to drive signals, said linear motor means including a coil assembly secured to the carriage and a track assembly positioned at a fixed relationship to said spar.

26. A scanning system, as set forth in claim 17, wherein the controller independently processes each set of digital data for providing modulating signals to a respective beam generator.

27. A scanning system, as set forth in claim 17, wherein the controller processes said digital data and provides modulating signals representative of a portion said digital data to each beam generator.

28. A scanning system, as set forth in claim 16, wherein the imaging device further comprises a media edge detector means for providing a position error signal to said controller, said position error signal representative of the displacement of an edge of the media from a zero reference point.

29. A scanning system, as set forth in claim 16, wherein the imaging device further comprises a sensing means for providing a home position signal when a scanning assembly is positioned at a predetermined location along said spar.

30. A scanning system, as set forth in claim 29, wherein the imaging device comprises a plurality of sensing means disposed in fixed relationship to said spar at location along the spar, one of said sensing means disposed adjacent the edge of media and another sensing means disposed intermediate a predetermined distance from the edge of the media.

31. An imaging device for scanning an image to media comprising:
 a scanning surface having a central longitudinal axis for securing the media thereto;
 a rigid spar extending the length of the scanning surface parallel to the longitudinal axis of said scanning surface, said spar having a pair of guide surfaces;
 a plurality of scanning assemblies for reflecting respective optical beams, said scanning assemblies movably coupled to the guide surfaces of the spar;
 a plurality of beam processors for each of a plurality of optical beams; and
 a controller for generating independent drive signals to move each of the scanning assemblies along the spar at a preferred rate, and for processing each of said optical beams.

32. An imaging device, as set forth in claim 31, wherein each beam processors is a beam generator for providing a modulated optical beam, said scanning assemblies reflect a respective optical beam to the media, and said controller providing signals to said beam generators, said signals representative of digital data representative of a image to be scanned onto the media.

33. An imaging device, as set forth in claim 31, wherein each beam processors is a beam receiver for providing imaging signals representative of an imaged disposed on the media; said scanning assemblies reflecting a plurality of optical beams to said respective optical beam receivers; and said controller generating digital signals representative of the imaging signals provided by said optical beam receivers.

34. An imaging device, as set forth in claim 31, wherein the optical beam processors include a pair of optical beam processors, each disposed at opposing ends of the scanning surface oriented to process an optical beam disposed along the central axis of the scanning surface; and said scanning assemblies including a pair of scanning assemblies, each arranged to reflect the respective optical beam.

35. An imaging device, as set forth in claim 31, wherein a pair of optical beam processors are disposed at one end of the scanning surface; one optical beam processor processing an off-axis optical beam disposed off the central longitudinal axis of the scanning surface; and one of said scanning assemblies including an optical periscope for reflecting said off-axis optical beam.

36. An imaging device, as set forth in claim 32, wherein the controller independently processes each set of digital data for providing modulating signals to a respective beam generator.

37. An imaging device, as set forth in claim 32, wherein the controller processes said digital data and provides modulating signals representative of a portion said digital data to each beam generator.

38. An imaging device, as set forth in claim 32, wherein the imaging device includes a plurality of raster image processors each providing an independent set of digital data representative of an image for each beam generator.

39. An imaging device, as set forth in claim 31, wherein one end of said spar extends beyond an outer edge of said scanning surface for parking a scanning assembly when not in use.

40. An imaging device, as set forth in claim 32, further includes a photodetection device disposed within the scanning surface for providing calibration signals representative of the location of an optical beam on the scanning surface relative to the position of a scanning assembly along the spar in a fast scan direction and representative of the location of an optical beam on the scanning surface relative to the rotational position of a mirror of a scanning assembly in a slow scan direction.

41. An imaging device, as set forth in claim 32, further includes a photodetection device disposed within the scanning surface for providing a calibration signal representative of the light intensity of an optical beam.

42. A method of scanning media secured to a scanning surface of an imaging device; the imaging device further including a rigid spar extending the length of the scanning surface and parallel to a central longitudinal axis of the scanning surface; a plurality of scanning assemblies for reflecting respective optical beams to the media, said scanning assemblies movably coupled to guide surfaces of the spar; a plurality of beam generators for emitting modulated optical beams to expose the media; and a controller for generating independent drive signals to move each of the scanning means along the spar at a preferred rate, and for generating digital signals representative of the image to be scanned, said method comprising the steps of:

(a) releasably securing the media onto the scanning surface;

(b) generating a position error signal representative of the difference between a zero reference position and the actual position of an edge of the media;

(c) moving independently each scanning assembly to a respective predetermined home position disposed on the media in response to said position error signal;

(d) moving independently each scanning assembly at a predetermine velocity a predetermined distance along the spar;

(e) generating a plurality of modulated optical beams representative of an image;

(f) emitting simultaneously each optical beam to a respective scanning assembly for reflecting the optical beam to the media as the scanning assemblies travel the predetermined distance along the spar.

43. A method of scanning media secured to a scanning surface of an imaging device; the imaging device further including a rigid spar extending the length of the scanning surface and parallel to a central longitudinal axis of the scanning surface; a plurality of beam receivers for generating imaging signals; a plurality of scanning assemblies for reflecting respective optical beams from the media to a respective beam receiver, said scanning assemblies movably coupled to guide surfaces of the spar; and a controller for generating independent drive signals to move each of the scanning means along the spar at a preferred rate, and for generating digital signals representative of the imaging signals provided by the optical beam receivers, said method comprising the steps of:

(a) securing the media onto the scanning surface;

(b) generating a position error signal representative of the difference between a zero reference position and the actual position of an edge of the media;

(c) moving independently each scanning assembly to a respective predetermined home position disposed on the media in response to said position error signal;

(d) moving independently each scanning assembly at a predetermine velocity a predetermined distance along the spar;

(e) generating a plurality of beams representative of the image disposed on the media;

(f) reflecting simultaneously each optical beam to a respective scanning assembly for reflecting the optical beam to a respective optical beam receiver as the scanning assemblies travel the predetermined distance along the spar.

44. A method of calibrating a location along a rigid spar of each of a plurality of scanning assemblies of an imaging system relative to a known location on a scanning surface; the rigid spar extending the length of the scanning surface and parallel to a central longitudinal axis of the scanning surface; the scanning assemblies reflecting respective optical beams to the scanning surface; the scanning assemblies movably coupled to guide surfaces of the spar; the imaging device further including a plurality of beam generators for emitting their respective optical beams; a photodetection disposed within a mask below the scanning surface; and a controller for generating independent drive signals to move each of the scanning means along the spar at a preferred rate, and for generating digital signals representative of the image to be scanned, said method comprising the steps of:

(a) moving a scanning assembly to an initial location adjacent a side edge of the mask;

(b) reflecting a corresponding optical beam to the scanning surface;

(c) moving the scanning assembly to the side edge of the mask;

(d) providing a calibration signal from the photodetection device in response to detection of optical beam;

(e) recording the location of the scanning assembly in response to the calibration signal; and (f) defining a location to initiate scanning of an image on the scanning surface in response to the calibration signal.

45. A method of calibrating a rotational position of a spinner mirror of each of a plurality of scanning assemblies of an imaging system relative to a known location on a scanning surface; the scanning assemblies reflecting respective optical beams to the scanning surface; the scanning assemblies movably coupled to guide surfaces of a spar extending the length of the scanning surface and parallel to a central longitudinal axis of the scanning surface; the imaging device further including a plurality of beam generators for emitting their respective optical beams; a photodetection device disposed within a mask below the scanning surface; and a controller for generating independent drive signals to move each of the scanning means along the spar at a preferred rate, and for generating digital signals representative of the image to be scanned, said method comprising the steps of:

(a) moving a scanning assembly to an initial location over the mask;

(b) reflecting a corresponding optical beam to the scanning surface, the optical beam emitting a segment of adjacent pixels illuminated for each rotation of the spinner motor;

(c) scanning the segment in the slow scan direction to an edge of th mask;

(d) providing a calibration signal from the photodetection device in response to detection of optical beam;

(e) recording the rotational position of the spinner mirror in response to the calibration signal; and (f) defining a location to initiate scanning of an image on the scanning surface in response to the calibration signal.

46. A method of defining the location of a side edge of a media plate disposed of a scanning surface of an imaging system relative to a location disposed on a spar; the rigid spar extending the length of the scanning surface and parallel to a central longitudinal axis of the scanning surface; the imaging device further including a scanning assembly for reflecting an optical beam to the scanning surface; the scanning assembly movably coupled to guide surfaces of the spar; a beam generator for emitting the optical beam; a photodetection device disposed within a mask below the scanning surface; and a controller for generating drive signals to move the scanning assembly along the spar at a preferred rate, and for generating digital signals representative of the image to be scanned, said method comprising the steps of:

(a) moving a scanning assembly to an initial location adjacent a side edge of the mask;

(b) reflecting a corresponding optical beam to the scanning surface;

(c) moving the scanning assembly across uncovered portion of the mask;

(d) providing a signal from the photodetection device in response t detection of optical beam;

(e) stopping the reflecting of the optical beam to the scanning surface in response signal provided by the photodetection device indicative of the loss of detection of the optical beam; and (f) recording the location of the scanning assembly in response to the loss of detection signal.

* * * * *